United States Patent
Cai et al.

(10) Patent No.: US 12,299,584 B2
(45) Date of Patent: May 13, 2025

(54) METHOD AND APPARATUS FOR TRAINING FEW-SHOT EVENT DETECTION MODEL BASED ON MULTILINGUAL PROMPT LEARNING

(71) Applicant: National University of Defense Technology, Hunan (CN)

(72) Inventors: Fei Cai, Hunan (CN); Siyuan Wang, Hunan (CN); Jianming Zheng, Hunan (CN); Wanyu Chen, Hunan (CN); Dengfeng Liu, Hunan (CN); Peihong Li, Hunan (CN); Shixian Liu, Hunan (CN); Xueshan Luo, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/774,585

(22) Filed: Jul. 16, 2024

(65) Prior Publication Data
US 2025/0028967 A1    Jan. 23, 2025

(30) Foreign Application Priority Data
Jul. 17, 2023 (CN) .......................... 202310877109.2

(51) Int. Cl.
*G06N 3/091* (2023.01)
*G06N 3/045* (2023.01)

(52) U.S. Cl.
CPC ............. *G06N 3/091* (2023.01); *G06N 3/045* (2023.01)

(58) Field of Classification Search
None
See application file for complete search history.

(56) References Cited

PUBLICATIONS

Conneau et al., Unsupervised Cross-lingual Representation Learning at Scale, In Proceedings of the 58th Annual Meeting of the Association for Computational Linguistics, pp. 8440-8451 (Year: 2020).*

Li et al., KiPT: Knowledge-injected Prompt Tuning for Event Detection, In Proceedings of the 29th International Conference on Computational Linguistics, pp. 1943-1952 (Year: 2022).*

(Continued)

*Primary Examiner* — Abdullah Al Kawsar
*Assistant Examiner* — Asher H. Jablon

(57) ABSTRACT

A method and apparatus for training a few-shot event detection model based on multilingual prompt learning are provided, which includes: acquiring a training data set, applying a multilingual prompt model to any instance to obtain a predicted probability distribution of a trigger tag, so as to obtain a first loss; generating a contrastive instance and a bilingual instance, and performing multilingual prompt and cross-lingual encoding according to the input instance and the bilingual instance by applying the multilingual prompt model to obtain joint event characterization; performing event tag prediction on the joint event characterization by applying a two-level hierarchical prototype network model, and calculating a second loss; performing contrastive learning on respective instances by applying a quaternary contrastive learning module to obtain a third loss; determining a total loss of the few-shot event detection model according to respective losses, and performing model training optimization based on the total loss.

8 Claims, 9 Drawing Sheets

(56) References Cited

PUBLICATIONS

Liu et al., Event Detection via Gated Multilingual Attention Mechanism, In The Thirty-Second AAAI Conference on Artificial Intelligence (AAAI-18), pp. 4865-4872 (Year: 2018).*

Sun et al., Hierarchical Attention Prototypical Networks for Few-Shot Text Classification, In Proceedings of the 2019 Conference on Empirical Methods in Natural Language Processing and the 9th International Joint Conference on Natural Language Processing, pp. 476-485 (Year: 2019).*

Tänzer et al., Memorisation versus Generalisation in Pre-trained Language Models, In Proceedings of the 60th Annual Meeting of the Association for Computational Linguistics vol. 1: Long Papers, pp. 7564-7578 (Year: 2022).*

Zhang et al., Hierarchical Prototype Networks for Continual Graph Representation Learning, In IEEE Transactions on Pattern Analysis and Machine Intelligence, vol. 45, No. 4, pp. 4622-4636 (Year: 2023).*

Chen et al., Beyond Triplet Loss: A Deep Quadruplet Network for Person Re-identification, In 2017 IEEE Conference on Computer Vision and Pattern Recognition, pp. 1320-1329 (Year: 2017).*

Dong et al., Quadruplet Network With One-Shot Learning for Fast Visual Object Tracking, IEEE Transactions on Image Processing, vol. 28, No. 7, pp. 3516-3527 (Year: 2019).*

\* cited by examiner

```
                                    ┌─ S11
┌─────────────────────────────────────────────────────────────────────┐
│ Extracting a training data set comprising a plurality of instances  │
│ from a preset network database by applying a data collector, each   │
│ of the plurality of instances comprising event text, a real trigger │
│ tag and a real event tag                                            │
└─────────────────────────────────────────────────────────────────────┘
                                    │
                                    ├─ S12
┌─────────────────────────────────────────────────────────────────────┐
│ Taking any instance in the training data set as an input instance,  │
│ and performing event triggering recognition by applying a           │
│ multilingual prompt model based on the event text of the input      │
│ instance to obtain a predicted probability distribution of a        │
│ trigger tag and obtain a first loss                                 │
└─────────────────────────────────────────────────────────────────────┘
                                    │
                                    ├─ S13
┌─────────────────────────────────────────────────────────────────────┐
│ Generating a contrastive instance and a bilingual instance          │
│ corresponding to the input instance according to the input          │
│ instance, and performing multilingual prompt and cross-lingual      │
│ encoding according to the input instance and the bilingual instance │
│ by applying the multilingual prompt model to obtain joint event     │
│ characterization                                                    │
└─────────────────────────────────────────────────────────────────────┘
                                    │
                                    ├─ S14
┌─────────────────────────────────────────────────────────────────────┐
│ Performing event tag prediction on the joint event characterization │
│ by applying a two-level hierarchical prototype network, and         │
│ calculating a second loss of the event tag prediction               │
└─────────────────────────────────────────────────────────────────────┘
                                    │
                                    ├─ S15
┌─────────────────────────────────────────────────────────────────────┐
│ Performing quaternary contrastive learning by applying a quaternary │
│ contrastive learning module according to the input instance, the    │
│ contrastive instance and the joint event characterization, and      │
│ obtaining a third loss                                              │
└─────────────────────────────────────────────────────────────────────┘
                                    │
                                    ├─ S16
┌─────────────────────────────────────────────────────────────────────┐
│ Determining a total loss of the few-shot event detection model      │
│ according to the first loss, the second loss and the third loss,    │
│ the few-shot event detection model comprising the multilingual      │
│ prompt model, the two-level hierarchical prototype network model    │
│ and a quaternary contrastive learning module, and performing model  │
│ training optimization on the few-shot event detection model based   │
│ on the total loss to obtain the few-shot event detection model;     │
│ inputting event text to be detected by applying the input/output    │
│ interface, the processor being configured for performing language   │
│ prompt learning on the event text to be detected based on a first   │
│ prompt template in the multilingual prompt model to obtain a        │
│ corresponding language prompt, and then performing cross-lingual    │
│ encoding by applying a cross-lingual encoding model in the          │
│ multilingual prompt model, which is realized by using an encoder    │
│ xlm-roberta-large, to obtain a trigger tag and event embedding;     │
│ calculating a child tag probability distribution for which the      │
│ event embedding is classified into a respective child tag in a      │
│ child prototype network by applying a two-level hierarchical        │
│ prototype network model, and selecting a maximum value of child     │
│ tag probability as a finally recognized event tag, so as to perform │
│ few-shot event management according to the detected trigger tag and │
│ the event tag, the two-level hierarchical prototype network model   │
│ being a type of prototype network, and the memory being configured  │
│ for storing the event text to be detected, the trigger tag and the  │
│ event tag                                                           │
└─────────────────────────────────────────────────────────────────────┘
```

FIG. 2

Input: train set $D_{train}$, development set $D_{dev}$ and tag set $Y$; initialized prototype network $E_p$, $E_c$; Translator $T_1$, $T_2$ and cross-lingual encoder Output: trained cross-lingual encoder and prototype network 1  for $(x, \hat{t}, \hat{y})$ in $\mathcal{D}_{train}, \mathcal{D}_{dev}$ do
2     contrastive instance: $(x^c, \hat{t}^c, \hat{y}^c), (x^p, \hat{t}^p, \hat{y}^p)$
3     Translation: $(x^{zh}, \hat{t}^{zh}), (x^{es}, \hat{t}^{es}) \xleftarrow{T_1, T_2} (x, \hat{t}, \hat{y})$
4     $p_t \xleftarrow{Scatter} \tilde{p}_t \xleftarrow{MLM} f_t(x)$    ▸ Formula (1) (2) (3)
5     $t = \arg\max_{x_i} p_i$
6     $e, e^c, e^p \xleftarrow{MLM} f_e(x, \hat{t}), f_e(x^c, \hat{t}^c), f_e(x^p, \hat{t}^p)$    ▸ Formula (5)
7     $e^{zh}, e^{es} \xleftarrow{MLM} f_e^{zh}(x^{zh}, \hat{t}^{zh}), f_e^{es}(x^{es}, \hat{t}^{es})$    ▸ Formula (6)
8     $e^{ml} = average(e, e^{zh}, e^{es})$
9     $p_{p_i}^{ml} = ParentProto(e^{ml})$    ▸ Formula (7)
10    for $e^j \in e, e^{ml}, e^c, e^p$ do
11       $p_{c_i}^j = ChildProto(e^j)$    ▸ Formula (8)
12    $\hat{y}_p = \arg\max_{y_{p_i}} p_{p_i}^{ml}, \hat{y} = \arg\max_{y_{c_i}} p_{c_i}^{ml}$
13    Update cross-lingual encoder, and prototype  ▸ Formula (15)
      network $E_p$ and $E_c$

FIG. 4

METHOD AND APPARATUS FOR TRAINING FEW-SHOT EVENT DETECTION MODEL BASED ON MULTILINGUAL PROMPT LEARNING

CROSS-REFERENCE TO RELATED APPLICATION

This application claims priority from the Chinese patent application 2023108771092 filed Jul. 17, 2023, the content of which are incorporated herein in the entirety by reference.

TECHNICAL FIELD

Embodiments of the disclosure relate to the technical field of few-shot event detection, in particular to a method and an apparatus for training a few-shot event detection model based on multilingual prompt learning.

BACKGROUND

With rapid development of information extraction technology, Event Detection (ED), as a basic part of such of technology, has increasingly attracted much attention, which is performed mainly by locating key triggers from text and then assigning a correct event tag to the text. In existing event detection methods, neural networks such as convolutional neural networks (CNNs), recurrent neural networks (RNNs) and graph neural networks (GNNs) are mainly adopted to obtain semantic information from monolingual texts. However, they still have semantic confusion in event detection, which is caused by confusion triggers that only provide limited monolingual clues. This confusion may be aggravated in few-shot event detection (FSED), because the tag text and semantics are sparse in the few-shot event detection. In addition, unbalanced distribution of triggers for event tags makes captured triggers tend to be unity, which aggravates semantic confusion.

In general few-shot event detection models, the few-shot event detection is extended to a set of meta-tasks consisting of support sets and query sets. By training on a large number of tagged meta-tasks and extracting meta-knowledge therefrom, good few-shot event detection performance on new meta-tasks can be achieved for these models, but it is still labor-intensive to annotate a large number of meta-tasks in application scenarios with scarce actual data. Moreover, the existing few-shot event detection methods are blind to semantic confusion, and cannot deal with a prediction trap caused by the confusing triggers, which degrades the few-shot event detection performance.

The semantic confusion is mainly attributed to polysemy confusion and synonym confusion. The polysemy confusion is caused by a trigger with different meanings. In order to solve this confusion, a gated multilingual attention mechanism can be adopted to extract supplementary information in multilingual data, but this method cannot be well applied to few-shot scenes. Because in the few-shot scenes, limited instances may not cover enough trigger semantics. The synonym confusion indicates that for the few-shot event detection models, instances triggered by scarce triggers are more difficult to be distinguished than those by common triggers with same semantics. In order to alleviate this confusion, semantics can be obtained from different trigger words by enriched knowledge distillation and knowledge-injected prompt. However, external knowledge is mainly used in such methods, ignoring semantic clues in a context that can capture a relationship between confused triggers and their tags.

SUMMARY

In view of problems described above, a method and an apparatus for training a few-shot event detection model based on multilingual prompt learning are provided in embodiments of the present disclosure, which overcomes or at least partially solves above problems.

According to an aspect of an embodiment of the disclosure, there is provided a method for training a few-shot event detection model based on multilingual prompt learning, which includes: extracting a training data set including a plurality of instances from a preset network database, each of the plurality of instances including event text, a real trigger tag and a real event tag; taking any instance in the training data set as an input instance, and performing event triggering recognition by applying a multilingual prompt model based on the event text of the input instance to obtain a predicted probability distribution of a trigger tag and obtain a first loss; generating a contrastive instance and a bilingual instance corresponding to the input instance according to the input instance, and performing multilingual prompt and cross-lingual encoding according to the input instance and the bilingual instance by applying the multilingual prompt model to obtain joint event characterization; performing event tag prediction on the joint event characterization by applying a two-level hierarchical prototype network model, and calculating a second loss of the event tag prediction; performing quaternary contrastive learning by applying a quaternary contrastive learning module according to the input instance, the contrastive instance and the joint event characterization, and obtaining a third loss; and determining a total loss of the few-shot event detection model according to the first loss, the second loss and the third loss, the few-shot event detection model including the multilingual prompt model, the two-level hierarchical prototype network model and a quaternary contrastive learning module, and performing model training optimization on the few-shot event detection model based on the total loss to obtain the few-shot event detection model; inputting event text to be detected by applying the input/output interface, the processor being configured for performing language prompt learning on the event text to be detected based on a first prompt template in the multilingual prompt model to obtain a corresponding language prompt, and then performing cross-lingual encoding by applying a cross-lingual encoding model in the multilingual prompt model, which is implemented by using the encoder xlm-roberta-large, to obtain a trigger tag and event embedding; calculating a child tag probability distribution for which the event embedding is classified into a respective child tag in a child prototype network by applying a two-level hierarchical prototype network model, and selecting a maximum value of child tag probability as a finally recognized event tag, so as to perform few-shot event management according to the detected trigger tag and the event tag, the two-level hierarchical prototype network model is a prototype network, and the memory being configured for storing the event text to be detected, the trigger tag and the event tag. The model xlm-roberta-large is a Natural Language Processing (NLP) Model implemented in Transformer library, generally using the Python programming language. The encoder xlm-roberta-large can be a scaled cross lingual sentence encoder. It is trained on 2.5 T of data across 100 languages data filtered from Common Crawl, and achieves state-of-the-arts results on multiple cross lingual benchmarks. XLM-RoBERTa is a multilingual version of RoBERTa. It can be pre-trained on 2.5 TB of filtered CommonCrawl data containing 100 languages. The two-level hierarchical prototype network is a hierarchical neural network and involves multiple layers where each successive layer captures increasingly abstract features from the input data.

In an alternative way, the extracting the training data set from the preset network database includes: extracting an unstructured event text x and an event tag space Y from the preset network database and assigning an event tag y∈Y to an event text x, with a process of event detection as x→(x,t)→y, and an instance being represented as a tuple (x, $\hat{t}$, $\hat{y}$), where $\hat{t}$, $\hat{y}$ represent a real trigger tag and a real event tag respectively, and then forming an original data set; and sampling a training set and a development set including N event tags from an original data set, each event tag containing k instances, with remaining instances forming a test set, so as to obtain a training data set including the training set, the development set and the test set.

In an alternative way, the performing the event triggering recognition by applying the multilingual prompt model based on the event text of the input instance to obtain the predicted probability distribution of a trigger tag and obtain a first loss includes: performing language prompt processing on the event text of the input instance by applying the first prompt template in the multilingual prompt model to obtain a modified language prompt; performing the event triggering recognition by applying a cross-lingual encoder model in the multilingual prompt model according to the language prompt corresponding to the input instance to obtain the predicted probability distribution of the trigger tag; and calculating the first loss according to the predicted probability distribution of the trigger tag.

In an alternative way, the bilingual instance includes a Chinese instance and a Spanish instance, and the performing multilingual prompt and cross-lingual encoding according to the input instance and the bilingual instance by applying the multilingual prompt model to obtain the joint event characterization includes: obtaining a first language prompt based on a real trigger tag in the input instance by applying an English prompt template in the multilingual prompt model according to the input instance; obtaining a second language prompt and a third language prompt based on the real trigger tag by respectively applying a Chinese prompt template and a Spanish prompt template in the multilingual prompt model according to the Chinese instance and the Spanish instance; performing cross-lingual encoding by applying a cross-lingual encoder model in the multilingual prompt model respectively according to the first language prompt, the second language prompt and the third language prompt to generate a corresponding first event embedding, second event embedding and third event embedding; and calculating an average of the first event embedding, the second event embedding and the third event embedding to obtain the joint event characterization of the event embedding.

In an alternative way, the two-level hierarchical prototype network model includes a parent prototype network and a child prototype network, and the performing event tag prediction on the joint event characterization by applying the two-level hierarchical prototype network model and calculating the second loss of the event tag prediction includes: respectively calculating a parent tag probability distribution for which the joint event characterization is classified into respective parent tags in the parent prototype network and a child tag probability distribution for which the joint event characterization is classified into respective child tags in the child prototype network; calculating a loss of the parent prototype network based on the parent tag probability distribution, and calculating a loss of the child prototype network based on the child tag probability distribution; and weighted summing the loss of the parent prototype network and the loss of the child prototype network to obtain the second loss of the two-level hierarchical prototype network model.

In an alternative way, the respectively calculating the parent tag probability distribution for which the joint event characterization is classified into the respective parent tags in the parent prototype network and the child tag probability distribution for which the joint event characterization is classified into the respective child tags in the parent prototype network includes: calculating a first distance between the joint event characterization and a respective parent tag in the parent prototype network, and obtaining a parent tag probability of the joint event characterization on all of parent tags according to the first distance so as to obtain the parent tag probability distribution of the joint event characterization, in which the predicted parent tag is a parent tag corresponding to a maximum parent tag probability; and calculating a second distance between the joint event characterization and a respective child tag in the child prototype network, and obtaining a child tag probability of the joint event characterization on all of child tags according to the first distance so as to obtain the child tag probability distribution of the joint event characterization, in which the predicted final tag is a child tag corresponding to a maximum child tag probability.

In an alternative way, the contrastive instance includes a homologous child tag instance and a heterogeneous child tag instance, and the performing the quaternary contrastive learning by applying the quaternary contrastive learning module according to the input instance, the contrastive instance and the joint event characterization and obtaining the third loss includes: performing the multilingual prompt and cross-lingual encoding on the input instance, the homologous child tag instance and the heterogeneous child tag instance by applying the multilingual prompt model, to respectively obtain a corresponding input instance event embedding, homologous child tag instance event embedding and heterogeneous child tag instance event embedding; processing the input instance event embedding, the homologous child tag instance event embedding, the heterogeneous child tag instance event embedding and the joint event characterization by applying the two-level hierarchical prototype network model to generate corresponding child tag probability distribution of the input instance, child tag probability distribution of the homologous child tag instance, child tag probability distribution of the heterogeneous child tag instance and joint child tag probability distribution respectively; calculating similarity between the child tag probability distribution of the input instance and the child tag probability distribution of the homologous child tag instance, the child tag probability distribution of the heterogeneous child tag instance and the joint child tag probability distribution respectively; and calculating the third loss according to respective similarity.

According to another aspect of an embodiment of the disclosure, there is provided an apparatus for training a few-shot event detection model based on multilingual prompt learning, which includes: a data collector configured for extracting a training data set including a plurality of instances from a preset network database, each of the plurality of instances including event text, a real trigger tag and a real event tag; a triggering recognition module configured for taking any instance in the training data set as an input instance, and performing event triggering recognition by applying a multilingual prompt model based on the event text of the input instance to obtain a predicted probability distribution of a trigger tag obtain a first loss; a joint characterization module configured for generating a contrastive instance and a bilingual instance corresponding to the input instance according to the input instance, and performing multilingual prompt and cross-lingual encoding according to the input instance and the bilingual instance by applying the multilingual prompt model to obtain joint event characterization; a tag prediction module configured for performing event tag prediction on the joint event characterization by applying a two-level hierarchical prototype network model and calculating a second loss of the event tag prediction; a quaternary contrastive learning module configured for performing quaternary contrastive learning by applying a quaternary contrastive learning module according to the input instance, the contrastive instance and the joint event characterization, and obtaining a third loss; and a model training and detection module configured for determining a total loss of a few-shot event detection model according to the first loss, the second loss and the third loss, the few-shot event detection model including the multilingual prompt model, the two-level hierarchical prototype network model and the quaternary contrastive learning module, and performing model training optimization on the few-shot event detection model based on the total loss to obtain the few-shot event detection model; performing language prompt learning based on a first prompt template in the multilingual prompt model to obtain a corresponding language prompt, and then performing cross-lingual encoding by applying a cross-lingual encoding model in the multilingual prompt model, which is implemented by using the encoder xlm-roberta-large, to obtain a trigger tag and event embedding; calculating a child tag probability distribution for which the event embedding is classified into a respective child tag in a child prototype network by applying a two-level hierarchical prototype network model, and selecting a maximum value of child tag probability as a finally recognized event tag, so as to perform few-shot event management according to the detected trigger tag and the event tag. The two-level hierarchical prototype network model is a prototype network, and the memory being configured for storing the event text to be detected, the trigger tag and the event tag.

According to another aspect of the embodiment of the disclosure, there is provided a computing device, which includes a processor, a memory, a communication interface and a communication bus. The processor, the memory and the communication interface are configured to be communicated with each other through the communication bus. The memory is configured for storing at least one executable instruction, which enables the processor to execute steps of the method for training the few-shot event detection model based on multilingual prompt learning described above.

According to another aspect of the embodiment of the present disclosure, there is provided a computer storage medium with at least one executable instruction stored therein, and the executable instruction enables the processor to execute steps of the method for training the few-shot event detection model based on multilingual prompt learning described above.

In the embodiment of the disclosure, the training data set including the plurality of instances is extracted from the preset network database, each of the plurality of instances includes event text, a real trigger tag and a real event tag. Any instance in the training data set is taken as an input instance, and event triggering recognition is performed by applying a multilingual prompt model based on the event text of the input instance to obtain a predicted probability distribution of a trigger tag and obtain a first loss. A contrastive instance and a bilingual instance corresponding to the input instance are generated according to the input instance, and multilingual prompt and cross-lingual encoding are performed according to the input instance and the bilingual instance by applying the multilingual prompt model to obtain joint event characterization. Event tag prediction is performed on the joint event characterization by applying a two-level hierarchical prototype network model and a second loss of the event tag prediction is calculated. Quaternary contrastive learning performed by applying a quaternary contrastive learning module according to the input instance, the contrastive instance and the joint event characterization, and a third loss is obtained. A total loss of the few-shot event detection model is determined according to the first loss, the second loss and the third loss, the few-shot event detection model includes the multilingual prompt model, the two-level hierarchical prototype network model and the quaternary contrastive learning module, and model training optimization is performed on the few-shot event detection model based on the total loss to obtain the few-shot event detection model, language prompt learning is performed based on a first prompt template in the multilingual prompt model to obtain a corresponding language prompt, and then cross-lingual encoding is performed by applying a cross-lingual encoding model in the multilingual prompt model, which is implemented by using the encoder xlm-roberta-large, to obtain a trigger tag and event embedding, a child tag probability distribution for which the event embedding is classified into a respective child tag in a child prototype network is calculated by applying a two-level hierarchical prototype network model, and a maximum value of child tag probability is selected as a finally recognized event tag, so as to perform few-shot event management according to the detected trigger tag and the event tag, which can eliminate polysemy confusion and synonym confusion, solve problems of insufficient tag representation and potential noise, and effectively improve accuracy of few-shot event detection.

The above description is only a summary of the technical scheme of embodiments of this disclosure, which can be implemented according to the contents of the description in order to understand the technical means of embodiments of this disclosure more clearly. In order to make the above and other objects, features and advantages of embodiments of this disclosure more obvious and understandable, the following is specific embodiments of this disclosure.

BRIEF DESCRIPTION OF THE DRAWINGS

Various other advantages and benefits will become obvious to those skilled in the art by reading the following detailed description of preferred embodiments. The drawings are only for a purpose of illustrating the preferred embodiments, and are not considered as limiting the disclosure. Moreover, like parts are represented by like reference numbers throughout the drawings. In the drawings:

FIG. 2 shows a flow chart of a method for training a few-shot event detection model based on multilingual prompt learning according to an embodiment of the present disclosure;

FIG. 4 shows a schematic diagram of a training optimization process of a few-shot event detection model according to an embodiment of the present disclosure;

DETAILED DESCRIPTION

Figure 1:
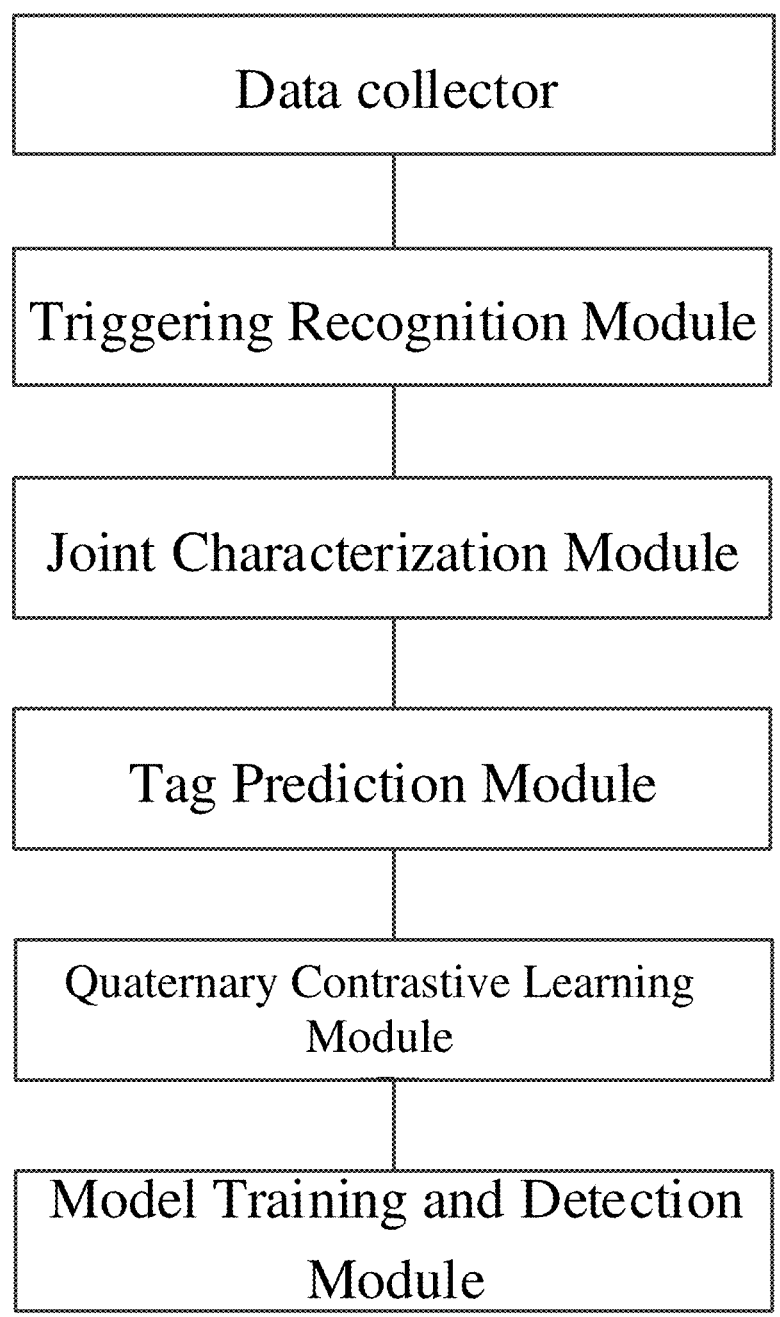
FIG. 1 shows a schematic structural diagram of an apparatus for training a few-shot event detection model based on multilingual prompt learning according to an embodiment of the present disclosure.

Exemplary embodiments of the present disclosure will be described in more detail below with reference to the drawings. Although the exemplary embodiments of this disclosure are shown in the drawings, it should be understood that this disclosure can be implemented in various forms and should not be limited to the embodiments set forth herein. On the contrary, these embodiments are provided to enable a more thorough understanding of this disclosure and to fully convey the scope of this disclosure to those skilled in the art.

The few-shot event detection according to the embodiment of the disclosure has wide practical significance for the development and application of current information service technologies:

(1) In terms of risk management and control, enterprises can be facilitated to find and solve potential problems in time by real-time monitoring and analysis of text data, reducing losses and risks, maintaining a good corporate image and reputation, and promoting sustained growth and development of business. Meanwhile, it is conducive to building a digital decision-making mechanism. By monitoring event information in real time, enterprises can adjust their strategies more flexibly and thus decision-making efficiency and quality can be improved;

(2) In terms of market operation, on a basis of fully understanding market conditions, the enterprises can dig and analyze the event information with aid of an event detection system, adjust a marketing strategy and product positioning more quickly, better cope with new changes and trends in market demand, which can help enterprises identify and use business opportunities hidden in the data, provide innovative products and services, and enhance their competitiveness and market response speed;

(3) In terms of public services, the few-shot event detection system can be quickly generalized to all aspects of public life with a small amount of labeled data, which provides effective support for diversified public information management, provides a reliable basis for public service departments to better carry out public opinion monitoring and social governance, and helps to further enhance a public service level of relevant departments and improve efficiency of information services.

For different application scenarios, users can set event tags suitable for an application scenarios as required, thus facilitating few-shot event detection.

The apparatus for training the few-shot event detection model based on multilingual prompt learning in the embodiment of the disclosure is applied to a robot, which can be a terminal device such as a server or a computer, and can also be a monitoring or management device of various enterprises or public service departments.

As shown in FIG. 1, the apparatus for training the few-shot event detection model based on multilingual prompt learning is applied to an electronic device, and a processor, a memory, an input/output interface and a communication interface in the electronic device implement communication connection with each other in the electronic device through a bus. The apparatus includes a data collector, a triggering recognition module, a joint characterization module, a tag prediction module, a quaternary contrastive learning module and a model training module.

The data collector is configured for extracting a training data set including a plurality of instances from a preset network database, and each of the plurality of instances includes event text, a real trigger tag and a real event tag. The data collector can be an external data acquisition device or a built-in data acquisition interface, as long as a corresponding data acquisition function can be realized, which is not specifically limited herein.

The triggering recognition module is configured for taking any instance in the training data set as an input instance, and performing event triggering recognition by applying a multilingual prompt model based on the event text of the input instance to obtain a predicted probability distribution of a trigger tag and obtain a first loss.

The joint characterization module is configured for generating a contrastive instance and a bilingual instance corresponding to the input instance according to the input instance, and performing multilingual prompt and cross-lingual encoding according to the input instance and the bilingual instance by applying the multilingual prompt model to obtain joint event characterization.

The tag prediction module is configured for performing event tag prediction on the joint event characterization by applying a two-level hierarchical prototype network model and calculating a second loss of the event tag prediction.

The quaternary contrastive learning module is configured for performing quaternary contrastive learning by applying a quaternary contrastive learning module according to the input instance, the contrastive instance and the joint event characterization, and obtaining a third loss.

The model training and detection module is configured for determining a total loss of a few-shot event detection model according to the first loss, the second loss and the third loss, the few-shot event detection model including the multilingual prompt model, the two-level hierarchical prototype network model and the quaternary contrastive learning module, and performing model training optimization on the few-shot event detection model based on the total loss to obtain the few-shot event detection model; inputting event text to be detected by applying the input/output interface, the processor being configured for performing language prompt learning on the event text to be detected based on a first prompt template in the multilingual prompt model to obtain a corresponding language prompt, and then performing cross-lingual encoding by applying a cross-lingual encoding model in the multilingual prompt model, which is implemented by using the encoder xlm-roberta-large, to obtain a trigger tag and event embedding; calculating a child tag probability distribution for which the event embedding is classified into a respective child tag in a child prototype network by applying a two-level hierarchical prototype network model, and selecting a maximum value of child tag probability as a finally recognized event tag, so as to perform few-shot event management according to the detected trigger tag and the event tag, and the memory is configured for storing the event text to be detected, the trigger tag and the event tag.

A more detailed process can be referred to a following method embodiment section. It should be noted that the method for training a few-shot event detection model according to the embodiment of the present disclosure can be completely executed by the robot, and correspondingly, the apparatus for training a few-shot event detection model can be provided in the robot.

Based on the above application scenario, FIG. 2 shows a flow chart of a method for training a few-shot event detection model based on multilingual prompt learning according to an embodiment of the present disclosure. and as shown in FIG. 2, the method for training the few-shot event detection model based on multilingual prompt learning is applied to an electronic device, and a processor, a memory, an input/output interface and a communication interface in the electronic device implement communication connection with each other in the electronic device through a bus. The method includes following steps S11 to S16.

In step S11, a training data set including a plurality of instances is extracted from a preset network database, and each of the plurality of instances includes event text, a real trigger tag and a real event tag.

In the embodiment of the disclosure, an unstructured event text x and an event tag space $Y \in R^N$ is extracted from a preset network database and an event tag $y \in Y$ is assigned to a event text x, and a process of event detection can be simplified as $x \rightarrow (x, t) \rightarrow y$, and an instance is represented as a tuple $(x, \hat{t}, \hat{y})$, where $\hat{t}, \hat{y}$ represent a real trigger tag and a real event tag respectively, and then an original data set is formed. Because annotation instances are limited in practical applications, a real few-shot paradigm is proposed to simulate a low-resource scenario.

A training set $\mathcal{D}_{train}$ and a development set $\mathcal{D}_{dev}$ including N event tags are sampled from an original data set, each event tag containing k instances, with remaining instances forming a test set $\mathcal{D}_{test}$, so as to obtain a training data set including the training set, the development set and the test set. Scales of the training set $\mathcal{D}_{train}$ and the development set $\mathcal{D}_{dev}$ are expressed as $|\mathcal{D}_{train}|=|\mathcal{D}_{dev}|=k \times N$.

Figure 3:
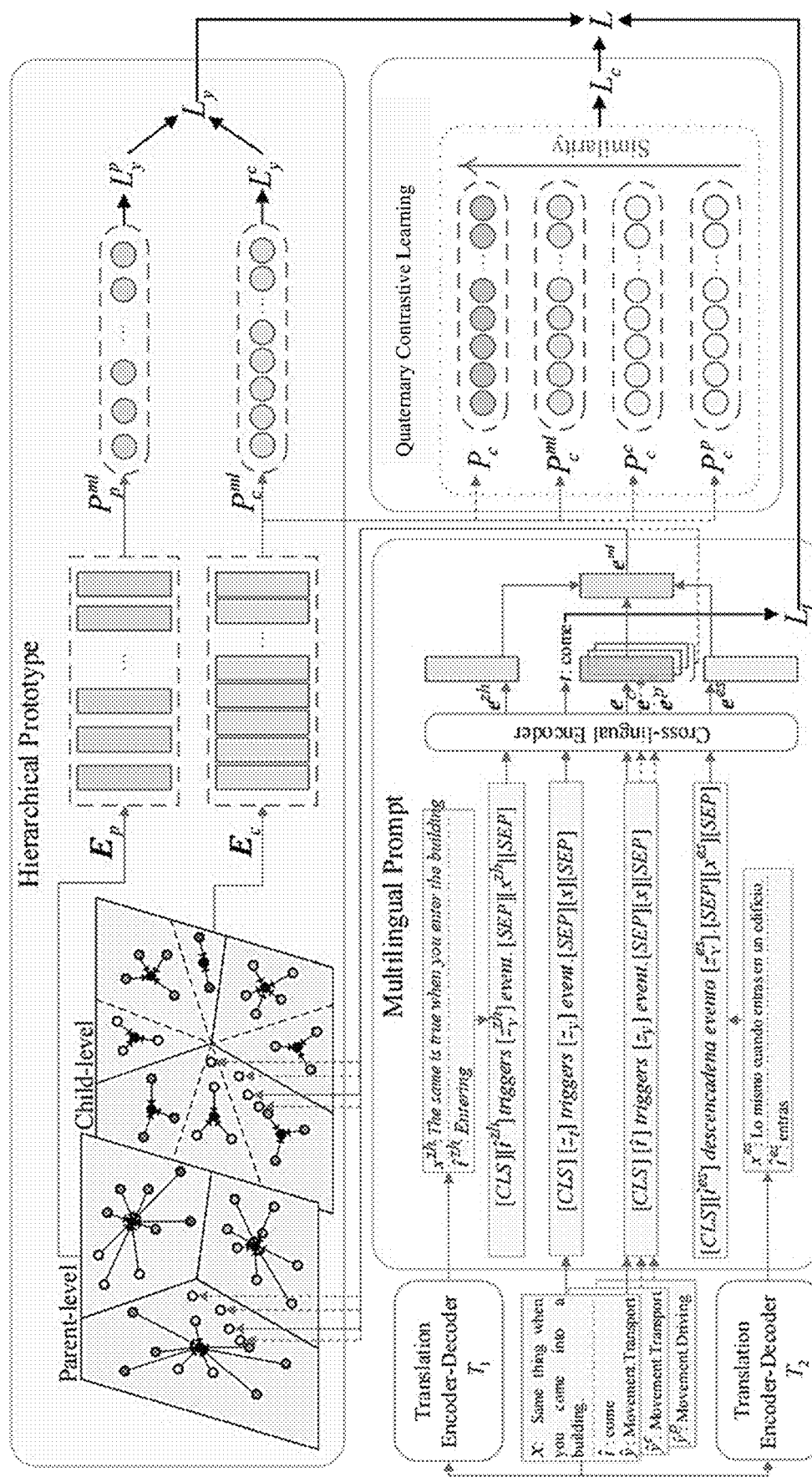
FIG. 3 shows a schematic structural diagram of a few-shot event detection model according to an embodiment of the present disclosure.

In the embodiment of the present disclosure, a structure of the few-shot event detection model MultiPLe is as shown in FIG. 3, including a multilingual prompt model, a two-level hierarchical prototype network model and a quaternary contrastive learning module. Illustration is made in FIG. 3 with an original English instance as an example, in which the event text x is: same thing when you come into a building, the real trigger tag $\hat{t}$ is: come, and the real event tag $\hat{y}$ is: Movement.Transport. In the multilingual prompt model, given an original English instance $(x, \hat{t}, \hat{y})$, a contrastive instance and a translated bilingual instance are firstly generated, and then modified in a corresponding prompt template to obtain a trigger tag t and a corresponding event embedding, and then the joint event characterization $e^{ml}$ can be further given to solve the polysemy confusion. Then, in the two-level hierarchical prototype network model, in order to solve a synonym confusion problem, a parent prototype network $E_p$ and a child prototype network $E_c$ are proposed to predict an event tag. Finally, similarity between contrastive instances is adopted by the quaternary contrastive learning module to mine subtle tag features and improve detection performance. In general, the few-shot event detection model MultiPLe outputs the predicted trigger tag t and event tag y, and is supervised by the total loss L to optimize the few-shot event detection model MultiPLe, mainly optimize model parameters of the two-level hierarchical prototype network model and the cross-lingual encoder model in the multilingual prompt model.

In step S12, any instance in the training data set is taken as an input instance, and event triggering recognition is performed by applying a multilingual prompt model based on the event text of the input instance to obtain a predicted probability distribution of a trigger tag and obtain a first loss.

In step S12, optionally, firstly, language prompt processing is performed on the event text of the input instance by applying the first prompt template in the multilingual prompt model to obtain a modified language prompt. For a first step of few-shot event detection $x \rightarrow (x, t)$, given an English instance $(x, \hat{t}, \hat{y})$, the event text x is linked to a manually constructed first prompt template, as shown by '$[z_t]$ triggers $[z_y]$ event.' in FIG. 3, and the modified language prompt $f_t$ is obtained as:

$$f_t(x) = [CLS][z_t] \text{ triggers } [z_y] \text{ event }.[SEP][x][SEP] \qquad (1)$$

where $[z_t]$ and $[z_y]$ are mask positions [MASK] corresponding to a final output trigger tag t and event tag t, respectively, x is the event text, [CLS] is an classification instruction and [SEP] is a separator.

Then the event triggering recognition is performed by applying a cross-lingual encoder model in the multilingual prompt model according to the language prompt corresponding to the input instance to obtain the predicted probability distribution of the trigger tag. Specifically, the modified language prompt $f_t(x)$ is input into the cross-lingual encoder model, $[z_t]$ is filled, and a score distribution $\check{P}_t$ based on an encoder vocabulary $V=\{v_i\}_{i=1}^L$ is output through a mask language modeling process as follows:

$$\check{P}_t = P([z_t] = t|f_t(x)) = P(t = v_i|V) \qquad (2)$$

Considering $t \in x$, the predicted probability distribution of the trigger tag is remapped from V to a character sequence $x_{1:l}=\{x_1, x_2, \ldots, x_l\}$, in which $x_{1:l}$ is converted from an initial text x by a word divider of the encoder, l indicates a character length of x. A probability distribution of the modified trigger tag $P_t$ can be expressed as:

$$P_t = P(t = x_i \mid x_{1:l}) = \{p_i\}_{i=1}^l \qquad (3)$$

where $p_i$ is probability of $x_i$ being identified as a trigger tag.

After the predicted probability distribution of the trigger tag $P_t$ is obtained, the final predicted trigger tag t can be expressed as $$t = \arg\max_{x_i} p_i.$$

Then cross entropy loss predicted by triggering recognition, that is, the first loss, is calculated according to the predicted probability distribution of the trigger tag as $L_t$:

$$L_t = -\sum_{i=1}^{l} q_i \log(p_i) \quad (4)$$

where $q_i$ indicates true probability, that is, if the actual trigger is $x_i$, $q_i=1$, otherwise, $q_i=0$. In the embodiment of the disclosure, the cross entropy loss predicted by triggering recognition is applied to perform triggering recognition training.

In step S13: a contrastive instance and a bilingual instance corresponding to the input instance are generated according to the input instance, and multilingual prompt and cross-lingual encoding are performed according to the input instance and the bilingual instance by applying a multilingual prompt model to obtain joint event characterization.

In the embodiment of the disclosure, after the predicted trigger tag t is obtained, a next operation (x, t)→y is performed. Before entering the prompt, for each tuple (x, t̂, ŷ), translators $T_1$ and $T_2$ generate bilingual instances without event tags, including a Chinese instance tuple ($x^{zh}$, $\hat{t}^{zh}$) and a Spanish instance tuple ($x^{es}$, $\hat{t}^{es}$). A contrastive instance (x, t̂, ŷ) corresponding to the input instance includes a homologous child tag instance ($x^c$, $\hat{t}^c$, $\hat{y}^c$) and a heterogeneous child tag instance ($x^p$, $\hat{t}^p$, $\hat{y}^p$). Respective parent tags and respective child tags in the two-level hierarchical prototype network model are compared according to the real event tag in the input instance, and a homologous child tag instance ($x^c$, $\hat{t}^c$, $\hat{y}^c$) and a heterogeneous child tag instance ($x^p$, $\hat{t}^p$, $\hat{y}^p$) corresponding to the input instance are generated. The homologous child tag instance ($x^c$, $\hat{t}^c$, $\hat{y}^c$) refers to a child tag under a same parent tag as the real event tag, while the heterogeneous child tag instance ($x^p$, $\hat{t}^p$, $\hat{y}^p$) refers to a child tag under a different parent tags from the real event tag.

In step S13, a multi-language prompt template is constructed as a clue to mask language modeling. An English template will be further improved on a basis of the real trigger tag t̂, with a form of "[t̂] triggers [$z_y$] event.". Optionally, a first language prompt $f_e$ is obtained based on a real trigger tag t̂ in the input instance by applying an English prompt template in the multilingual prompt model according to the input instance:

$$f_e(x, \hat{t}) = [CLS][\hat{t}] \text{ triggers } [z_y] \text{ event. } [SEP][x][SEP] \quad (5)$$

Then a second language prompt $f_e^{zh}$ and a third language prompt $f_e^{es}$ are obtained based on the real trigger tag by respectively applying a Chinese prompt template and a Spanish prompt template in the multilingual prompt model according to the Chinese instance and the Spanish instance.

That is, similarly, referring to FIG. 3, two other prompt templates $f_e^{zh}$ and $f_e^{es}$ are designed, which are respectively expressed as:

$$\begin{cases} f_e^{zh}(z^{zh}, \hat{t}^{zh}) = [CLS][\hat{t}^{zh}] \text{ triggers } [z_y^{zh}] \text{ event. } [SEP][x^{zh}][SEP] \\ f_e^{es}(z^{es}, \hat{t}^{es}) = [CLS][\hat{t}^{es}] \text{ descencadena evento } [z_y^{es}]. [SEP][x^{es}][SEP] \end{cases} \quad (6)$$

where [$z_y^{zh}$] and [$z_y^{es}$] represent mask positions corresponding to the event tag.

Then, a cross-lingual encoder model in the multilingual prompt model is applied to perform cross-lingual encoding respectively according to the first language prompt, the second language prompt and the third language prompt to generate a corresponding first event embedding e, second event embedding $e^{zh}$ and third event embedding $e^{es}$; and an average of the first event embedding e, the second event embedding $e^{zh}$ and the third event embedding $e^{es}$ is calculated to obtain the joint event characterization $e^{ml} \in R^d$ of the event embedding, where d is a dimension of the event characterization.

In Step S14: event tag prediction is performed on the joint event characterization by applying a two-level hierarchical prototype network model, and a second loss of the event tag prediction is calculated.

The two-level hierarchical prototype network model in the few-shot event detection model shown in FIG. 3 includes a parent prototype network and a child prototype network. In an existing data set ACE-2005 and a data set FewEvent, all event tags can be decomposed into parent tags and child tags. For example, a tag "Movement.Transport" is with a parent tag of "Movement" and a child tag of "Movement.Transport" respectively. Intuitively, an event tag with a homologous parent tag is more similar than that with a heterogeneous parent tag. Therefore, a new hierarchical prototype module is proposed to describe inheritance relationship between event tags, which includes a parent prototype network and a child prototype network.

In step S14, optionally, firstly, a parent tag probability distribution for which the joint event characterization is classified into respective parent tags in the parent prototype network and a child tag probability distribution for which the joint event characterization is classified into respective child tags in the parent prototype network are respectively calculated.

For the parent prototype network, a parent tag space $Y_p \in R^n$ is constructed from an initial tag space $Y \in R^N$ in the embodiment of the disclosure, where a number of the parent tags is less than a number of initial tags n<N. A parent tag of an instance is denoted as $\hat{y}_p \in Y_p$. Meanwhile, the parent prototype network $E_p = \{e_{p_1}, e_{p_2}, \ldots, e_{p_n}\}$ is randomly initialized, in which $e_p^i \in E_p$ is a d-dimension vector representing a spatial centroid of a i-th parent tag $y_{p_i}$.

In the embodiment of the disclosure, a first distance between the joint event characterization $e^{ml}$ and a respective parent tag $y_{p_i}$ in the parent prototype network is calculated, and a parent tag probability of the joint event characterization on all of parent tags is obtained according to the first distance so as to obtain the parent tag probability distribution of the joint event characterization, in which the predicted parent tag is a parent tag corresponding to a maximum parent tag probability. The first distance between the joint event characterization $e^{ml}$ and the respective parent tag $y_{p_i}$ in the parent prototype network is $d(e^{ml}, e_{p_i})$, and a probability $p_{p_i}^{ml}$ that the joint event characterization $e^{ml}$ is classified to the parent tag $y_{p_i}$ is:

$$p_{p_i}^{ml} = \frac{\exp(-d(e^{ml}, e_{p_i}))}{\sum_{j=1}^{n} \exp(-d(e^{ml}, e_{p_i}))} \tag{7}$$

where $d(\cdot,\cdot)$ is an Euclidean distance, which is used to indicate similarity between the joint event characterization $e^{ml}$ and the parent tag $y_{p_i}$. In this way, a parent tag probability distribution $P_p^{ml} = \{p_{p_i}^{ml}\}_{i=1}^{n}$ of the joint event characterization on all of the parent tags can be obtained.

Similar to the parent prototype network, the child prototype network $E_c = \{e_{c_1}, e_{c_2}, \ldots, e_{c_N}\}$ is randomly initialized firstly, in which a prototype of each child tag can be expressed as $e_{c_i} \in E_c$, a d-dimension vector. A second distance $d(e^{ml}, e_{c_i})$ between the joint event characterization $e^{ml}$ and a respective child tag $y_{c_i}$ in the child prototype network is calculated, and a child tag probability of the joint event characterization on all of child tags is obtained according to the first distance so as to obtain the child tag probability distribution of the joint event characterization, in which the predicted final tag is a child tag corresponding to a maximum child tag probability. That is, by projecting the joint event characterization $e^{ml}$ on the child prototype network $E_c$, a probability $y_{c_i}$ that the joint event characterization $e^{ml}$ belongs to a i-th child tab $y_{c_i}$ can be generated:

$$p_{c_i}^{ml} = \frac{\exp(-d(e^{ml}, e_{c_i}))}{\sum_{j=1}^{N} \exp(-d(e^{ml}, e_{c_i}))} \tag{8}$$

where $e_{c_i} \in E_c$ is a d-dimension vector representing a spatial centroid of a i-th child tag. In this way, a child tag probability distribution is formed as $P_c^{ml} = \{p_{c_i}^{ml}\}_{i=1}^{N}$.

After the parent tag probability distribution and the child tag probability distribution are obtained, a loss of the parent prototype network is calculated based on the parent tag probability distribution, and a loss of the child prototype network is calculated based on the child tag probability distribution. The loss $L_y^p$ of the parent prototype network is:

$$L_y^p = -\sum_{i=1}^{n} q_{p_i}^{ml} \log(p_{p_i}^{ml}) \tag{9}$$

where $q_{p_i}^{ml}$ indicates a true probability, that is, if $\hat{y}_p = y_{p_i}$, $q_{p_i}^{ml} = 1$, otherwise, $q_{p_i}^{ml} = 0$. The parent prototype network is optimized through the cross entropy loss described above.

The loss $L_y^c$ of the child prototype network is:

$$L_y^c = -\sum_{i=1}^{N} q_{c_i}^{ml} \log(p_{c_i}^{ml}) \tag{10}$$

where $q_{c_i}^{ml}$ indicates a true probability, that is, if $\hat{y} = y_{c_i}$, $q_{c_i}^{ml} = 1$, otherwise, $q_{c_i}^{ml} = 0$. The child prototype network is optimized through the cross entropy loss described above.

Finally, the loss of the parent prototype network and the loss of the child prototype network are weighted summed to obtain the second loss of the two-level hierarchical prototype network model. That is, the loss $L_y^p$ of the parent prototype network and the loss $L_y^c$ of the child prototype network are combined to generate the second loss Ly of the two-level hierarchical prototype network model:

$$L_y = \alpha L_y^p + \beta L_y^c \tag{11}$$

where $\alpha, \beta \in R$ indicate weights of the parent prototype network and the child prototype network respectively.

It should be noted that in a training stage, $e^{ml}$ is projected on both $E_p$ and $E_c$. However, in testing, the event representation e is first projected on $E_p$, so that a predicted parent tag $y_p$ with a highest probability $p_{p_i}$ in Equation (12) can be obtained. Then, when e is projected on $E_c$, only a distance between e and a centroid corresponding to a child tag belonging to $y_p$ is calculated to obtain a corresponding probability $p_{c_i}$:

$$\begin{cases} p_{p_i} = \frac{\exp(-d(e, e_{p_i}))}{\sum_{j=1}^{n} \exp(-d(e, e_{p_i}))} \\ p_{c_i} = \frac{\exp(-d(e, e_{c_i}))}{\sum_{j=1}^{N_p} \exp(-d(e, e_{c_i}))} \end{cases} \tag{12}$$

where $Y_c(y_p) \in R^{N_p}$ is a child tag set with $y_p$, and $N_p < N$. Therefore, a final output y is an event tag with a greatest probability $p_{c_i}$. To this end, the step $(x, t) \rightarrow y$ is completed.

Step S15: quaternary contrastive learning is performed by applying a quaternary contrastive learning module according to the input instance, the contrastive instance and the joint event characterization, and a third loss is obtained.

In the embodiment of the disclosure, the contrastive instance include the homologous child tag instance and the heterogeneous child tag instance generated previously. Because foreign semantics may be introduced by a translation pre-training language model when a confused trigger is translated, the multilingual prompt model may bring extra noise in model training. In order to overcome potential interference and further incorporate subtle features of different event tags, a quaternary contrastive learning module is introduced, which follows three rules.

(1) A corresponding instance of joint event characterization $e^{ml}$ can be regarded as a most-similar instance to the input instance among all intra-class instances.

(2) Intra-class instances with a homologous child tag (for example, the instances with tags $\hat{y}$ and $\hat{y}^c$ in FIG. 3) are more similar than inter-class instances with a homologous parent tag but with a heterogeneous child tag (for example, instances corresponding to $\hat{y}$ and $\hat{y}_p$).

(3) Inter-class instances with the homologous parent tag are more similar than those with the homologous parent tag.

Based on above rules, an instance quadruple can be constructed. In a descending order of similarity with the input instance $(x, \hat{t}, \hat{y})$ with the tag $\hat{y}$, the multilingual instance is a first contrastive instance with a highest similarity in the quadruple. A next one is the intra-class instance corresponding to the homologous child tag $\hat{y}^c$, that is, the homologous child tag instance $(x^c, \hat{t}^c, \hat{y}^c)$, and then the instance with the homologous parent tag but with the heterogeneous child tag $\hat{y}_p$, that is, the heterogeneous child tag instance $(x^p, \hat{t}^p, \hat{y}^p)$.

In step S15, optionally, firstly, the multilingual prompt and cross-lingual encoding are performed on the input instance, the homologous child tag instance and the heterogeneous child tag instance by applying the multilingual prompt model, to respectively obtain a corresponding input instance event embedding, homologous child tag instance event embedding and heterogeneous child tag instance event embedding. That is, as the input instance, the last two contrastive instances, i.e., the homologous child tag instance $(x^c, \hat{t}^c, \hat{y}^c)$ and the heterogeneous child tag instance $(x^p, \hat{t}^p, \hat{y}_p)$, are input into the multilingual prompt model for the multilingual prompt and cross-lingual encoding, and corresponding respective event embeddings e, $e^c$ and $e^p$ can be obtained. Then, the input instance event embedding, the homologous child tag instance event embedding, the heterogeneous child tag instance event embedding and the joint event characterization are processed by applying the two-level hierarchical prototype network model to generate corresponding child tag probability of the input instance $P_c$, child tag probability of the homologous child tag instance $P_c^c$, child tag probability of the heterogeneous child tag instance $P_c^p$ and joint child tag probability $P_c^{ml}$ respectively. That is, by projection into the parent prototype network $E_p$ and the child prototype network $E_c$ in the two-level hierarchical prototype network model, respective child tag probability distributions $P_c$, $P_c^c$ and $P_c^p$, as well as a child tag probability distribution $P_c^{ml}$ of joint event characterization $e^{ml}$ obtained above can be generated.

Then, similarity between the child tag probability distribution of the input instance and the child tag probability distribution of the homologous child tag instance, the child tag probability distribution of the heterogeneous child tag instance and the joint child tag probability distribution are calculated respectively. The more similar the instances are, the closer the child tag probability distributions are, which can be expressed as:

$$d(P_c, P_c^{ml}) < d(P_c, P_c^c) < d(P_c, P_c^p) \quad (13)$$

$d(P_c, P_c^{ml})$ represents similarity between the child tag probability distribution of the input instance and the joint child tag probability distribution, $d(P_c, P_c^c)$ represents similarity between the child tag probability distribution of the input instance and the child tag probability distribution of the homologous child tag instance, and $d(P_c, P_c^p)$ represents similarity between the child tag probability distribution of the input instance and the child tag probability distribution of the heterogeneous child tag instance.

In particular, for a parent tag with only one child tag, a last contrastive instance may be replaced with an instance with a homologous parent tag.

Finally, the third loss is calculated according to respective similarity. The third loss is the quadruple contrastive loss of the quaternary contrastive learning module, which can be expressed as:

$$L_c = d(P_c, P_c^{ml}) + \max(0, m - (d(P_c, P_c^c) - d(P_c, P_c^{ml}))) + \\ \max(0, m - (d(P_c, P_c^p) - d(P_c, P_c^c))) \quad (14)$$

where $m \in R$ is a margin.

In Step S16: a total loss of the few-shot event detection model is determined according to the first loss, the second loss and the third loss, the few-shot event detection model includes the multilingual prompt model, the two-level hierarchical prototype network model and the quaternary contrastive learning module, and model training optimization is performed on the few-shot event detection model based on the total loss to obtain the few-shot event detection model; event text to be detected is input by applying the input/output interface, the processor is configured for performing language prompt learning on the event text to be detected based on a first prompt template in the multilingual prompt model to obtain a corresponding language prompt, and then cross-lingual encoding is performed by applying a cross-lingual encoding model in the multilingual prompt model, which is implemented by using the encoder xlm-roberta-large, to obtain a trigger tag and event embedding; a child tag probability distribution for which the event embedding is classified into a respective child tag in a child prototype network is calculated by applying a two-level hierarchical prototype network model, and a maximum value of child tag probability is selected as a finally recognized event tag, so as to perform few-shot event management according to the detected trigger tag and the event tag, and the memory is configured for storing the event text to be detected, the trigger tag and the event tag.

In the embodiment of the present disclosure, the first loss, the second loss and the third loss obtained above are weighted summed to obtain the total loss of the few-shot event detection model, which can be expressed as:

$$L = \gamma_1 L_t + \gamma_2 L_y + \gamma_3 L_c \quad (15)$$

where $\gamma_i \in R$ (i=1, 2, 3) is a loss weight of a respective part in the few-shot event detection model. $L_t$, $L_y$, $L_c$ are generated by Formula (4), Formula (11) and Formula (14) respectively.

In the embodiment of the disclosure, model training optimization is performed on the few-shot event detection model based on the total loss to obtain the few-shot event detection model. A complete model training optimization process of the few-shot event detection model is shown in FIG. 4. Given each tuple (x, $\hat{t}$, $\hat{y}$), firstly, the contrastive instance $(x^c, \hat{t}^c, \hat{y}^c)$ $(x^p, \hat{t}^p, \hat{y}_p)$ and the bilingual instances $(x^{zh}, \hat{t}^{zh})$, $(x^{es}, \hat{t}^{es})$ translated by a translator $T_1$ and a translator $T_2$ are obtained in steps 1 to 3. Triggering recognition is performed in step 4, that is, the modified prompt $f_t(x)$ is input into the cross-lingual encoder, and an original distribution $\tilde{P}_t$ is generated by mask language modeling (MLM), and the trigger distribution $P_t$ is further generated. Then the recognized trigger tag t is obtained in step 5. Then, in steps 6 and 7, the corresponding event embeddings are output by using the multilingual prompt, and the joint event characterization $e^{ml}$ is further obtained in step 8. In steps 9 to 11, respective parent tag probabilities and child tag probabilities can be calculated by projection into the parent prototype network $E_p$ and the child prototype network $E_c$. Therefore, the predicted parent tag $y_p$ and final tag y can be obtained in step 12 according to a predefined tag set Y. Finally, in step 13, the few-shot event detection model is optimized by using Equation (15), and mainly the two-level hierarchical prototype network model and the cross-lingual encoder model in the multilingual prompt model are optimized. Translator T1 and translator T2 use translation neural networks.

With the few-shot event detection model MultiPLe in the embodiment of the disclosure, the semantic confusion in the few-shot event detection is alleviated. The semantic confusion is divided into the polysemy confusion and the synonym confusion. Context semantics of the trigger are captured by the multilingual prompt model and the joint event characterization is generated, and the context semantics of the trigger are developed through multilingual disambiguation and prior knowledge in the pre-trained language model so as to eliminate the polysemy confusion; distinguishable tag features closely related to fuzzy triggers are captured by the two-level hierarchical prototype network model, and deep semantics of the captured fuzzy triggers are finely linked to the tags to alleviate serious synonym confusion; and the quaternary contrastive learning module is configured to enhance tag representation, avoid potential noise in model training, thus solving problems of insufficient tag representation and potential noise.

It should be noted that after the training and optimization of the few-shot event detection model MultiPLe is completed, the predicted trigger tag t is used to replace the real trigger tag t in Equation (5) at a testing stage of the few-shot event detection model MultiPLe or during actual few-shot event detection. In order to be fair, only monolingual prompts $f_e(x, t)$ are used in the testing stage, instead of multilingual prompts, namely $f_e(x, t)$, $f_e^{zh}(x^{zh}, \hat{t}^{zh})$ and $f_e^{es}(x^{es}, \hat{t}^{es})$. That is, the text x of the event to be detected is input into the multilingual prompt model, and the monolingual prompt $f_e(x, t)$ is generated through the English prompt template, which is input into the cross-lingual encoder model, the original distribution $\tilde{P}_t$ is generated through mask language modeling, and the trigger distribution $P_t$ is further generated so as to obtain the predicted trigger tag t. Then, the corresponding event embeddings e are output by using the multilingual prompts, during which semantic signals from other languages are not introduced, and the embeddings e is directly used as the event representation to ensure fairness. Then the event embeddings e are projected into the parent prototype network $E_p$ and the child prototype network $E_c$, so as to calculate their respective parent tag and child tag probabilities. According to Formula $$y_p = \arg\max_{y_{pi}} p_{p_i}$$

and Formula $$y = \arg\max_{y_{ci}} p_{c_i},$$

the predicted parent tag $y_p$ and finally recognized event tag y can be obtained.

After the few-shot event detection model is obtained, the few-shot event detection model is applied to perform few-shot event detection on the event text to be detected based on a preset application, so as to manage the preset application according to the detected few-shot event. That is, after the event text to be detected is collected, the language prompt learning is performed based on the first prompt template in the multilingual prompt model to obtain the corresponding language prompt, and then cross-lingual encoding is performed by applying a cross-lingual encoding model in the multilingual prompt model, which is implemented by using the encoder xlm-roberta-large, to obtain a trigger tag and event embedding. A child tag probability distribution for which the event embedding is classified into a respective child tag in a child prototype network is calculated by applying the two-level hierarchical prototype network model, and a maximum value of child tag probability is selected as a finally recognized event tag. Thus, few-shot event management for the preset application can be performed according to the detected trigger tag and the event tag. The cross-language encoder model of the embodiment of the present invention is implemented using the encoder xlm-roberta-large. It has 24 hidden layers, outputs a 1024-dimensional tensor, 16 self-attention heads, and a total of 550M parameters, 100 types in 2.5 TB It is trained on language texts. The two-level hierarchical prototype network model is a prototype network that creates a prototype representation for each category, and for a query that needs to be classified, the distance between the prototype vector of the category and the query point is used to determine it, which has high generalization It has high generalization ability and adaptability.

The preset application involves risk management, market operation and public services. The few-shot event detection model based on multilingual prompt learning obtained by training through the method for training the few-shot event detection model based on multilingual prompt learning according to the embodiment of the disclosure can be applied to risk management and control, market operation, public service and other aspects, so as to improve accuracy of few-shot event detection, and thus relevant measures can be taken according to the detected few-shot event to achieve better risk management and control, market operation, public service and the like. For example, for the risk management and control, the obtained text data can be measured through the trained few-shot event detection model based on multilingual prompt learning, and few-shot events that have impact on enterprise risk management and control can be accurately detected, so as to adjust the strategy more flexibly and improve efficiency and quality of decision-making, which can help enterprises find and solve potential problems in time and reduce losses and risks.

In the following, the few-shot event detection model based on multilingual prompt learning in the embodiment of the present disclosure is verified, and performance of the few-shot event detection model MultiPLe and a competitive baseline model are evaluated on two public data sets, namely ACE-2005 and FewEvent. ACE-2005 is a popular data set for event detection published by LDC, which contains 3,887 instances with corresponding trigger tags and event tags. FewEvent was put forward by Deng et al, which contains 71,376 instances and is marked with a total 100 event tags. Statistics of ACE-2005 and FewEvent applied in the embodiment of the present disclosure can be referred in Table 1.

TABLE 1

Statistics of data set used in experiments

| Data | ACE-2005 | FewEvent |
|---|---|---|
| # Parent tag | 8 | 19 |
| # Child tag/tag | 33 | 100 |

TABLE 1-continued

Statistics of data set used in experiments

| Data | ACE-2005 | FewEvent |
|---|---|---|
| # Maximum number of triggers of tag | 231 | 247 |
| # Average number of triggers of tag | 36.2 | 36.1 |
| # Average text length | 25.7 | 31.9 |
| # Total number of instances | 3,887 | 71,376 |

In order to adapt to a real few-shot paradigm, several k-sample experiments were carried out as an evaluation. In the embodiment of the present disclosure, $k \in \{4, 8, 16, 32\}$ is selected. In addition, an instance with a trigger tag inconsistent with an index range of annotation is deleted, and a tag with an instance size less than 2 k is also deleted because they are not enough to build the training/development/test set with a k-sample setting. In addition to the test set $\mathcal{D}_{test}$, following three random sampling methods are used to generate a k-sample test set for evaluation:

Instance-Uniform Sampling (IUS): k instances are randomly sampled for each tag.

Trigger-Uniform Sampling (TUS): k instances are sampled for each tag according to a uniform trigger.

COnfusion Sampling (COS): On a basis of TUS, k instances are selected for each tag according to a confusion trigger, and tags of these instances are hard to be distinguished.

The baseline model in the embodiment of the disclosure can be divided into following two categories: (1) Three metric-based models, namely Neural-Bert, Relation-Bert and Proto-Bert, in which an event embedding is obtained by [CLS] in an encoder bert-base-uncased; (2) Three prompt-based models, namely KiPT, ZEOP and MsPrompt. In Neural-Bert, a neural network adopted as a classifier to distinguish event tags of each text. To be precise, a classifier network it uses is a single fully connected layer. In Relation-Bert, a relational network is applied to few-shot event detection. Firstly, a tag feature is linked to an event embedding generated in an embedding module, and a relationship score is obtained through the relational module. The two modules involved are a prototype network and a single fully connected layer respectively. In Proto-Bert, a prototype network is used as a classifier, a distance between the event embedding and the centroid of each tag is calculated, and a nearest centroid is further output as a predicted tag. In KiPT, T5 is used as an encoder, and the event embedding is generated by soft prompting and introducing rich knowledge injected from an external knowledge base. In ZEOP, prompt learning and ordered contrast learning are combined to improve prediction ability for invisible event tags, in which bert-base-uncased is used to encode event instances. In MsPrompt, a general one-step prompt is extended to a multi-step prompt, and knowledge-enhanced ontology is added to solve problems of context bypass and generalization failure caused by trigger deviation. An encoder for mask language modeling is bert-base-uncased.

In the embodiment of the disclosure, a cross-lingual encoder xlm-roberta-large is used to realize MultiPLe, so as to obtain the predicted trigger tag and multi-language event embedding, and an used optimizer is AdamW, with weight decay of $1e^{-6}$. For ACE-2005 and FewEvent, a learning rate of xlm-roberta-large is $1e^{-6}$, $1e^{-5}$, while a learning rate of the prototype network is $1e^{-3}$, $1e^{-2}$. A total number of cycles for ACE-2005 and FewEvent is 300 and 100 respectively. Weights in Formula (11) are $\alpha$, $\beta$, and are 1 and 1 respectively on ACE-2005 and, are 1 and 2 respectively on FewEvent. A margin m in Formula (14) is 2, and $\gamma_1$, $\gamma_2$, $\gamma_3$ in Formula (15) are 1, 1 and 2 respectively. A number of batches in the training phase and the testing phase is 4 and 16 respectively. If loss is not reduced in 1000 iterations, the model is terminated. An index mainly adopted in the embodiment of the disclosure is a weighted F1 score, which is widely used in the few-shot event detection.

In order to evaluate overall performance, four k-sample experiments are carried out to evaluate real few-shot event detection performance of MultiPLe and the baseline model. Results of the weighted F1 score on ACE-2005 and FewEvent are shown in Table 2. A best-performing baseline model and a best-performing model in each column are underlined and bolded respectively.

TABLE 2

Performance of Models on Weighted F1 Score (%)

| Model | ACE-2005 | | | | FewEvent | | | |
|---|---|---|---|---|---|---|---|---|
| | k = 4 | k = 8 | k = 16 | k = 32 | k = 4 | k = 8 | k = 16 | k = 32 |
| Metric-based model | | | | | | | | |
| Neural-Bert | 18.43 | 21.54 | 42.86 | 46.65 | 13.87 | 27.11 | 55.69 | 73.32 |
| Relation-Bert | 44.09 | 47.95 | 52.17 | 60.33 | 41.53 | 44.30 | 56.03 | 56.84 |
| Proto-Bert | 15.20 | 31.24 | 43.24 | 57.13 | 43.09 | 58.61 | 70.07 | 72.95 |
| Prompt-based model | | | | | | | | |
| KiPT | 45.50 | 50.10 | 54.20 | 56.40 | 54.87 | 61.34 | 65.23 | 68.72 |
| ZEOP | 44.52 | 58.92 | 62.99 | 69.66 | 57.63 | 65.71 | 71.41 | 73.79 |
| MsPrompt | 46.30 | 60.29 | 61.88 | 69.94 | 60.67 | 60.83 | 73.35 | 73.90 |
| MultiPLe | 59.93 | 67.73 | 69.23 | 70.21 | 66.03 | 68.97 | 82.76 | 87.45 |

According to Table 2, prompt-based models, including MultiPLe, are usually better than metric-based models. It shows that powerful semantic ability of a large-scale pre-training language model can be used in prompt learning and model training can be facilitated by eliciting relevant knowledge. In the prompt-based models, MultiPLe has achieved best performance. In addition, all the models performed better on FewEvent than on ACE-2005, because there were more tags in FewEvent, which brings more training examples (see Table 1). On two data sets, larger k values usually lead to better experimental results, which proves that more training data facilitates model performance.

For ACE-2005, MultiPLe has obvious advantages compared with all of the baseline models. For example, compared with the best-performing baseline (a model corresponding to underlined results), the weighted F1 scores are increased by 13.63%, 7.44%, 6.24% and 0.27% with settings of k=4, 8, 16 and 32, respectively for MultiPLe. In these experiments, improvement is greatest in a 4-sample setting, which shows that MultiPLe can effectively improve event detection performance with scarce training data. In ACE-2005, performance of MultiPLe is improved gradually, and is increased by 7.80%, 1.50% and 0.98% respectively from the 4-sample to 32-sample. This phenomenon shows that information gain brought by increasing a size of few-shot training set is decreasing. This shows that traditional event detection models are too data-hungry, and it may be futile to continuously increase a number of annotation instances, because relatively high performance can be obtained just by making full use of the few-shot training set.

On FewEvent, MultiPLe also shows superior performance. Compared with the best-performing baseline model, with settings of k=4, 8, 16 and 32, the weighted F1 scores of MultiPLe can be improved by 5.36%, 3.26%, 9.41% and 13.55% respectively. It can be considered that this substantial improvement may be due to a fact that MultiPLe can alleviate semantic confusion and extract tag features from limited data. Different from ACE-2005, when the training set is increased from 8-sample to 16-sample, performance of MultiPLe on FewEvent is significantly improved. This shows that moderately increasing the number of instances can greatly help training of the model.

Figure 5:
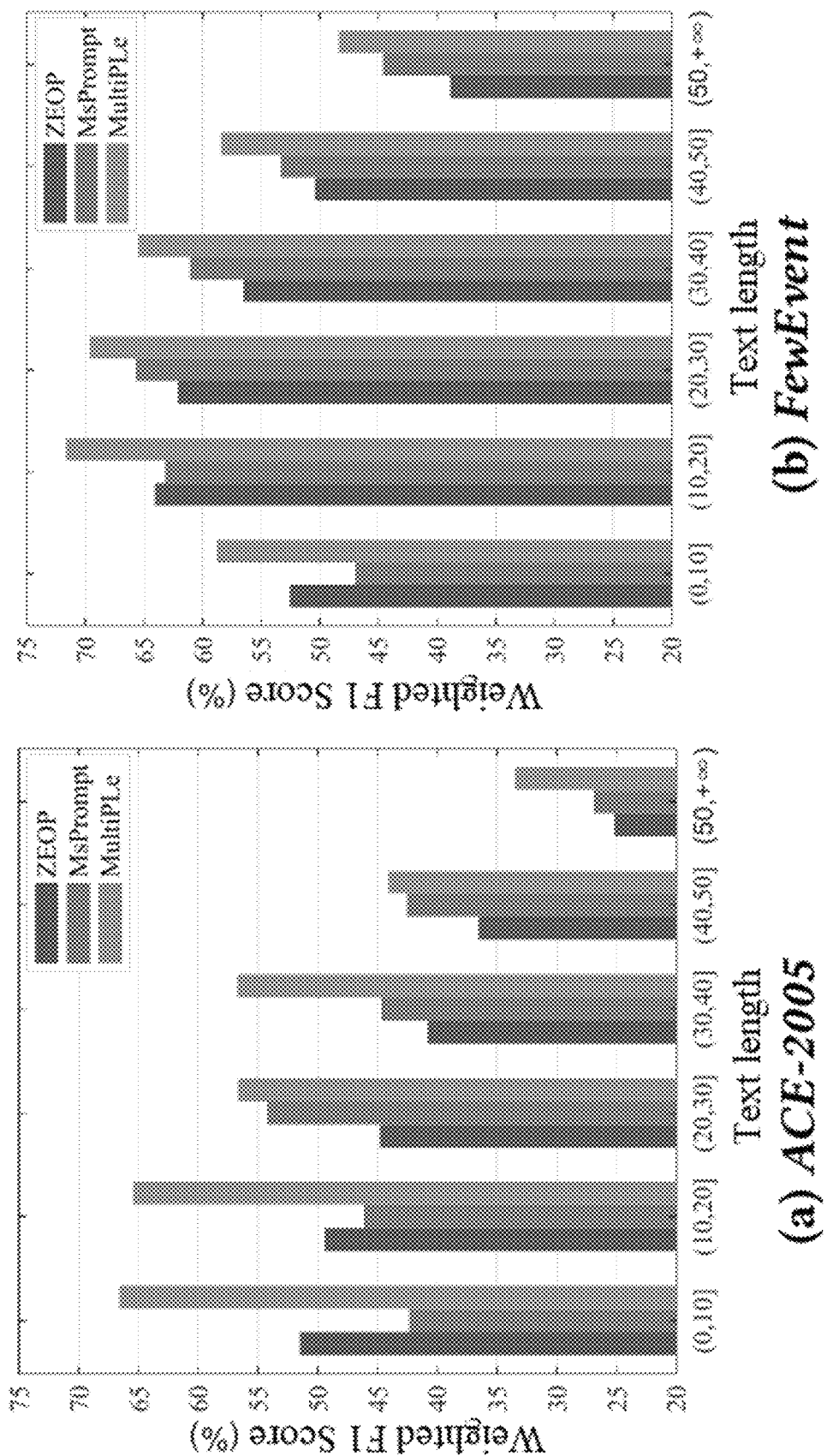
FIG. 5 is a schematic diagram showing performance comparison between a few-shot event detection model according to an embodiment of the present disclosure and a baseline model in different text lengths.

In order to evaluate performance on instances with different text lengths, several test sets with different text lengths are used to evaluate MultiPLe and better-performing baseline models (ZEOP and MsPrompt) in the k-sample setting on ACE-2005 and FewEvent. According to average text lengths for ACE-2005 (25.7 words) and FewEvent (31.9 words) shown in Table 1, six text length ranges are selected as follows: (0, 10], (10, 20], (20, 30], (30, 40], (40, 50] and (50, +∞). Results of the weighted F1 score are shown in FIG. 5. With increase in text length, performance of all of models shows a similar trend on ACE-2005 and FewEvent: either it continues to decline, or it rises before reaching the peak, and then declines. This downward trend may be due to a fact that longer texts contain more scattered or misleading information on event detection. For example, inaccurate information may be introduced by a multilingual prompt model of MultiPLe after translating long texts. Initial performance increase may be attributed to two factors. Firstly, compared with other text length ranges, FewEvent has fewer training instances in a text length of (0, 10], which leads to performance improvement of all of models from (0, 10] to (10, 20] by more than 10%. Secondly, performance of MsPrompt reaches its peak in a case of (20, 30], probably because its prompt uniquely combines initial text, triggers and external knowledge within this length range. Among the three methods, MultiPLe shows best performance in the weighted F1 score on all text lengths of the two data sets. For example, as shown in FIG. 5a, a performance peak of MultiPLe on ACE-2005 is achieved for an input length of (0,10], which is nearly 15% and 25% higher than that of ZEOP and MsPrompt, respectively. Compared with ZEOP and MsPrompt, MultiPLe has improved by more than 5% at a performance turning point (10, 20) for a FewEvent data set in FIG. 5b. These substantial improvements show that MultiPLe can extract rich semantic information to supplement limited event knowledge, enhance tag representation in low-resource scenes, and improve few-shot event detection performance.

Figure 6:
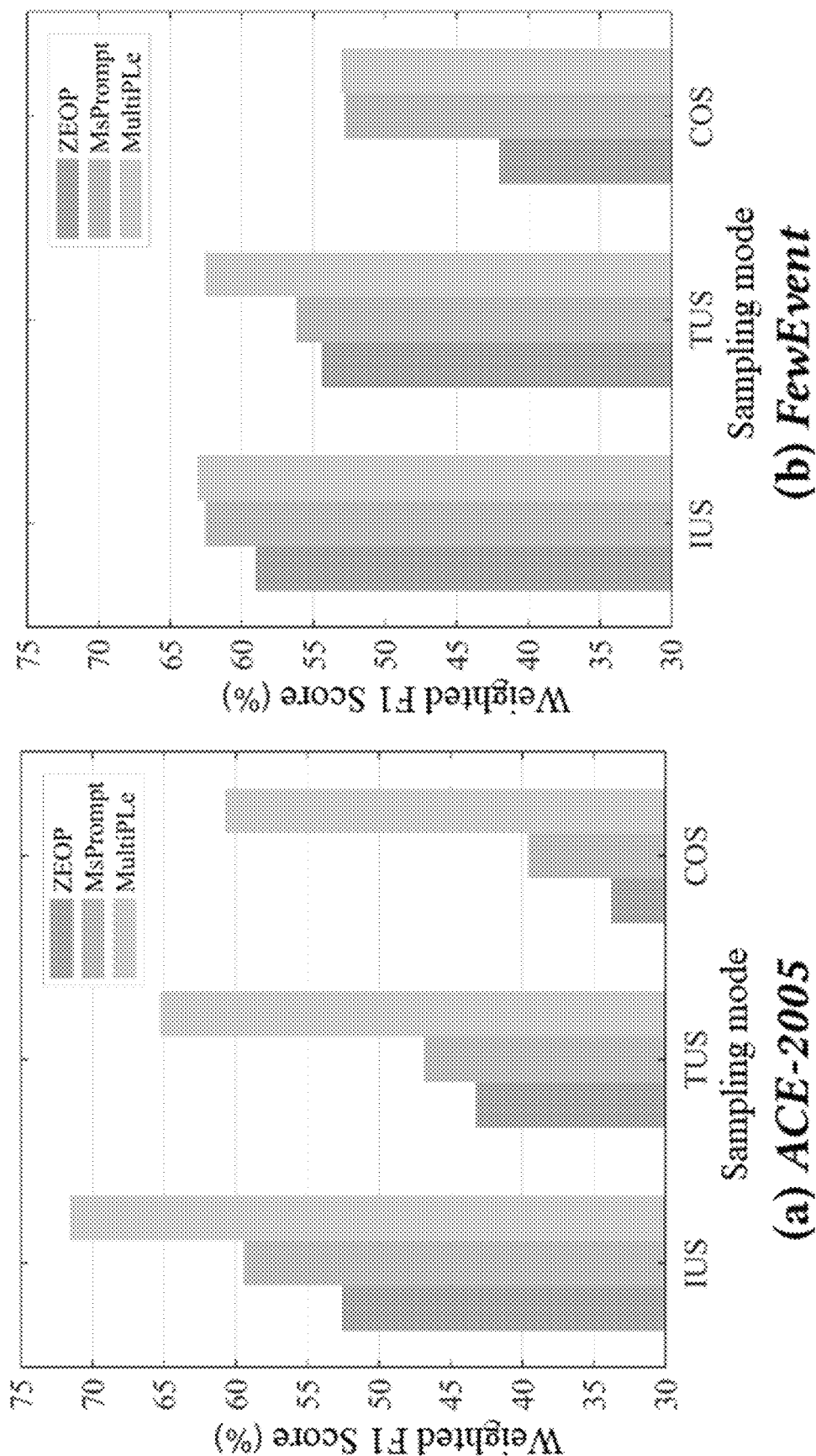
FIG. 6 is a schematic diagram showing performance comparison between a few-shot event detection model according to an embodiment of the present disclosure and a baseline model based on different sampling methods.

In order to test robustness of different sampling methods, 4-sample test sets of ACE-2005 and FewEvent are manually constructed by using three sampling methods: IUS, TUS and COS, and the few-shot event detection performance of ZEOP, MsPrompt and MultiPLe on these test sets is evaluated. Results of the weighted F1 score are shown in FIG. 6. Generally, performance of respective models is gradually declining from IUS to TUS to COS. This shows that unbalanced trigger distribution exaggerates evaluation results of IUS, and a sampling method of COS is challenging because of chaotic triggers. It can be seen from FIG. 6a that MultiPLe has achieved best performance with all of sampling methods on ACE-2005, followed by MsPrompt and ZEOP. Compared with MsPrompt, the weighted F1 scores for IUS, TUS and COS are increased by more than 10%, 15% and 20% respectively. Biggest improvement on COS shows that MultiPLe alleviates semantic confusion from triggers. In addition, compared with MsPrompt and ZEOP, performance of MultiPLe degrades more steadily, with a gradual decline of nearly 5%. This shows that MultiPLe is more robust on a biased IUS test set and an unbiased TUS/COS test set, and has obvious trigger debias effect. It can be seen from FIG. 6b that MultiPLe achieves a largest weighted F1 score again with all sampling methods. Remarkable results on two data sets show that MultiPLe is robust in various sampling methods. This can be attributed to the multilingual prompt model of MultiPLe, which reduces uneven trigger distribution and alleviates confusion by enhancing multilingual semantics. Especially, with settings of IUS and TUS, results of MultiPLe are very similar. On FewEvent, largest improvement of MultiPLe lies in TUS instead of COS. However, compared with other models, increase in MultiPLe is less than that in ACE-2005. This may be because a number of tags of FewEvent is almost three times that of ACE-2005 (Table 1), its performance gains from MultiPLe are diluted in this low-resource scenario.

Figure 7:
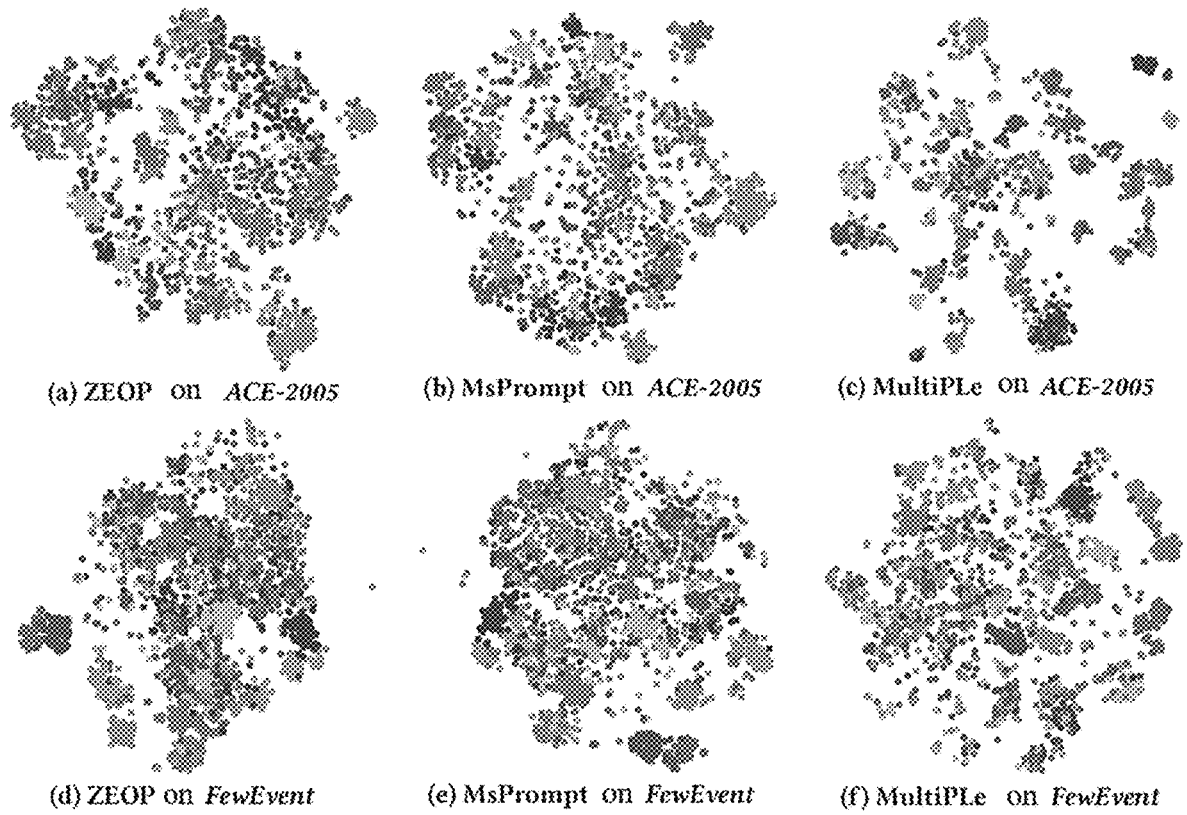
FIG. 7 is a schematic diagram showing clustering performance comparison between a few-shot event detection model according to an embodiment of the present disclosure and a baseline model.

In order to evaluate clustering performance of MultiPLe, that is, whether correct tags can be assigned to event representations accurately, event representations generated in MultiPLe, ZEOP and MsPrompt are visualized for test instances in 4-sample settings of ACE-2005 and FewEvent respectively. The event representations are colored by using t-SNE according to actual event tags. As shown in FIG. 7, clustering degree of the three models to the event representation can be intuitively observed. Because of a large scale of a tag set for FewEvent, clustering on FewEvent is more chaotic than that on ACE-2005. In addition, clustering of MultiPLe on the two data sets is most significant, followed by MsPrompt and ZEOP. For example, unlike fuzzy clustering in FIGS. 7a and 7b (results of ZEOP and MsPrompt on ACE-2005), different clusters with clear boundaries in FIG. 7c are generated in MultiPLe. Similarly, in FIG. 7d/7e, clusters for ZEOP/MsPrompt are dense, with only a few obvious clusters, while in FIG. 7f, many clusters with clear boundaries are formed for MultiPLe. This shows that MultiPLe can well represent events and capture tag features, because a hierarchical prototype of MultiPLe can serve to mine subtle tag features from a parent-child tag hierarchy. While the quaternary contrastive learning module also provides enough tag signals.

In order to evaluate which module in MultiPLe contributes the most to its performance, ablation study in Table 3 is conducted, in which respective modules are replaced or deleted to explore their influence so as to verify contribution of the respective modules of MultiPLe to the performance with the 4-sample setting on FewEvent. "−" indicates deleting a corresponding part from MultiPLe. A result of MultiPLe is shown in bold. ▼ indicates a maximum performance degradation result compared with MultiPLe. Measure standard is weighted accuracy/recall/F1 score, and "weighting" is omitted for simplicity. Specifically, "-multilingual prompt" means to return to the original English prompt; "-hierarchical prototype" means to ignore the parent prototype network; and "-quadruple contrastive learning" means to completely delete this module. In addition, specific parts of the multilingual prompt are deleted to check their influences, namely "Chinese prompts" and "Spanish prompts" which convert the multilingual prompt into corresponding bilingual prompts respectively.

TABLE 3

Ablation study with the 4- sample setting

| Model | Accuracy (%) | Recall rate (%) | F1 score (%) |
|---|---|---|---|
| -MultiPLe | 73.12 | 71.00 | 66.03 |
| -multilingual prompt | 68.66 | 66.72 | 60.24 |
| -Chinese prompt | 70.79 | 68.89 | 63.37 |
| -Spanish prompt | 68.83 | 66.45 | 60.15 |
| -Hierarchical prototype | 66.96 | 63.60▼ | 56.51 |
| -Quaternary contrastive learning | 66.32▼ | 63.63 | 56.28▼ |

According to Table 3, compared with MultiPLe, all of variant models of MultiPLe have different degrees of performance degradation. Maximum weighting accuracy and F1 score decrease (6.80% and 9.75%) originate from removing a model corresponding to the quaternary contrastive learning module. After removing the two-level hierarchical prototype network, the weighted recall rate decreased the most (7.40%). This shows that these two modules can well represent tags and capture distinguishable features, so as to avoid synonym confusion and greatly improve performance of the few-shot event detection. In addition, "-multilingual prompt", "-Chinese prompt" and "-Spanish prompt" reduced the weighted F1 score by 5.79%, 2.66% and 5.88% respectively. These results confirm that the multilingual prompt model and its components are essential for MultiPLe to maintain its high performance in event detection in low-resource scenarios. In particular, deleting the Spanish prompt may results in decrease of the maximum weighted F1 score, which shows that the Spanish prompt plays an important role in supplementing fuzzy triggers and event semantics, and helps to eliminate polysemy confusion.

Figure 8:
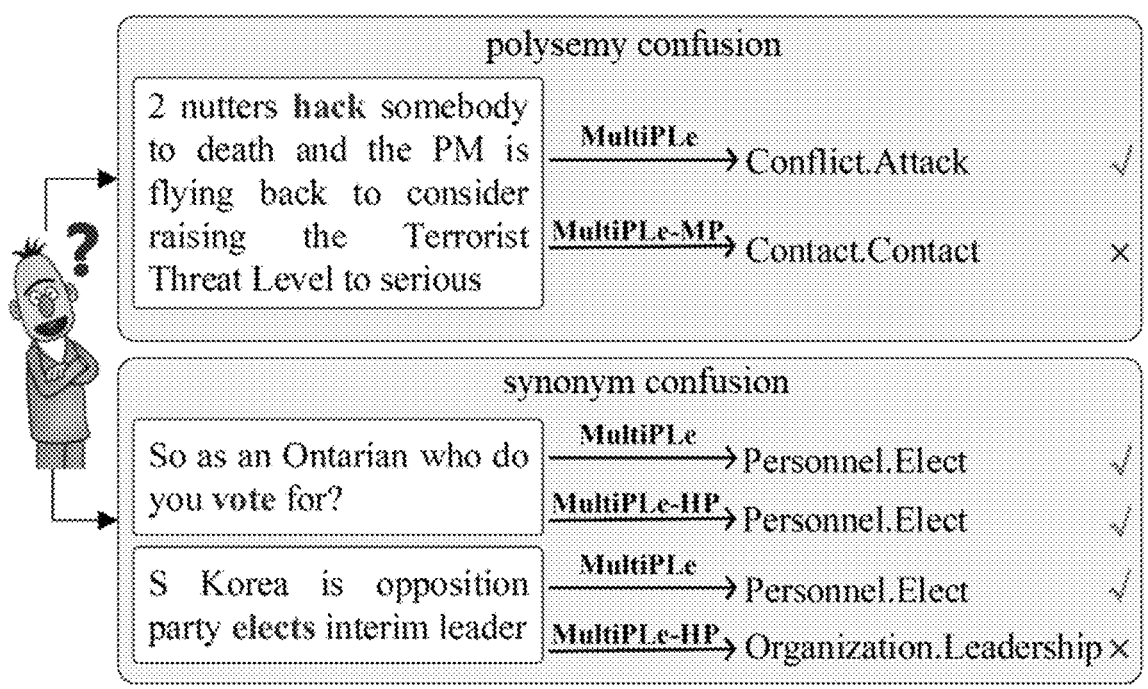
FIG. 8 is a schematic diagram showing semantic confusion alleviation performance comparison between a few-shot event detection model according to an embodiment of the present disclosure and a baseline model.

In order to verify semantic confusion alleviation performance of the few-shot event detection model based on multilingual prompt learning, MultiPLe, MultiPLe-MP and multiple-HP ("-multilingual prompt"/"-hierarchical prototype") are compared using specific cases. FIG. 8 shows semantic confusion in predicting test instances in FewEvent with the 4-sample setting. For the polysemy confusion, for a same trigger "hack" and text, MultiPLe predicts "Conflict.Attack" and MultiPLe-MP predicts "Contact.Contact". The former is correct; but the latter was misled by other meaning of "hack". This shows that the multilingual prompt model can serve to find trigger semantics that are in line with the context by adding multilingual information, and thus help MultiPLe to deal with polysemous words. For the synonym confusion, "vote" and "elects" have same meaning and should be predicted as "Personnel.Elect". Both MultiPLe and MultiPLe-HP predict "vote" as the tag, but it is different for "elects". This confirms outstanding effect of MultiPLe in solving the synonym confusion by adopting the hierarchical prototype module. Therefore, the results show that MultiPLe can get in-depth trigger information and map it to event representation, which facilitates solving of semantic confusion.

In the method for training the few-shot event detection model based on multilingual prompt learning according to embodiments of the disclosure, a training data set including a plurality of instances is extracted from a preset network database, each of the plurality of instances includes event text, a real trigger tag and a real event tag; any instance in the training data set is taken as an input instance, and event triggering recognition is performed by applying a multilingual prompt model based on the event text of the input instance to obtain a predicted probability distribution of a trigger tag and obtain a first loss; a contrastive instance and a bilingual instance corresponding to the input instance are generated according to the input instance, and multilingual prompt and cross-lingual encoding are performed according to the input instance and the bilingual instance by applying the multilingual prompt model to obtain joint event characterization; event tag prediction is performed on the joint event characterization by applying a two-level hierarchical prototype network model, and a second loss of the event tag prediction is calculated; quaternary contrastive learning is performed by applying a quaternary contrastive learning module according to the input instance, the contrastive instance and the joint event characterization, and a third loss is obtained; and a total loss of the few-shot event detection model is determined according to the first loss, the second loss and the third loss, the few-shot event detection model includes the multilingual prompt model, the two-level hierarchical prototype network model and a quaternary contrastive learning module, and model training optimization is performed on the few-shot event detection model based on the total loss to obtain the few-shot event detection model; event text to be detected is input by applying the input/output interface, the processor is configured for performing language prompt learning on the event text to be detected based on a first prompt template in the multilingual prompt model to obtain a corresponding language prompt, and then cross-lingual encoding is performed by applying a cross-lingual encoding model in the multilingual prompt model, which is implemented by using the encoder xlm-roberta-large, to obtain a trigger tag and event embedding; a child tag probability distribution for which the event embedding is classified into a respective child tag in a child prototype network is calculated by applying a two-level hierarchical prototype network model, and a maximum value of child tag probability is selected as a finally recognized event tag, so as to perform few-shot event management according to the detected trigger tag and the event tag, and the memory is configured for storing the event text to be detected, the trigger tag and the event tag, which can eliminate polysemy confusion and synonym confusion, solve problems of insufficient tag representation and potential noise, and effectively improve accuracy of few-shot event detection. The two-level hierarchical prototype network model and a quaternary contrastive learning module, and performing model training optimization on the few-shot event detection model based on the total loss to obtain the few-shot event detection model; inputting event text to be detected by applying the input/output interface On a basis of the same concept, an electronic device is also provided in this disclosure, which includes a memory, a processor and a computer program stored on the memory and operable on the processor, and the processor implements the method described in any one of the above embodiments when executing the program.

A nonvolatile computer storage medium with at least one executable instruction stored therein is provided in an embodiment of the present disclosure, and the computer executable instruction can execute the method described in any of the above embodiments.

Figure 9:
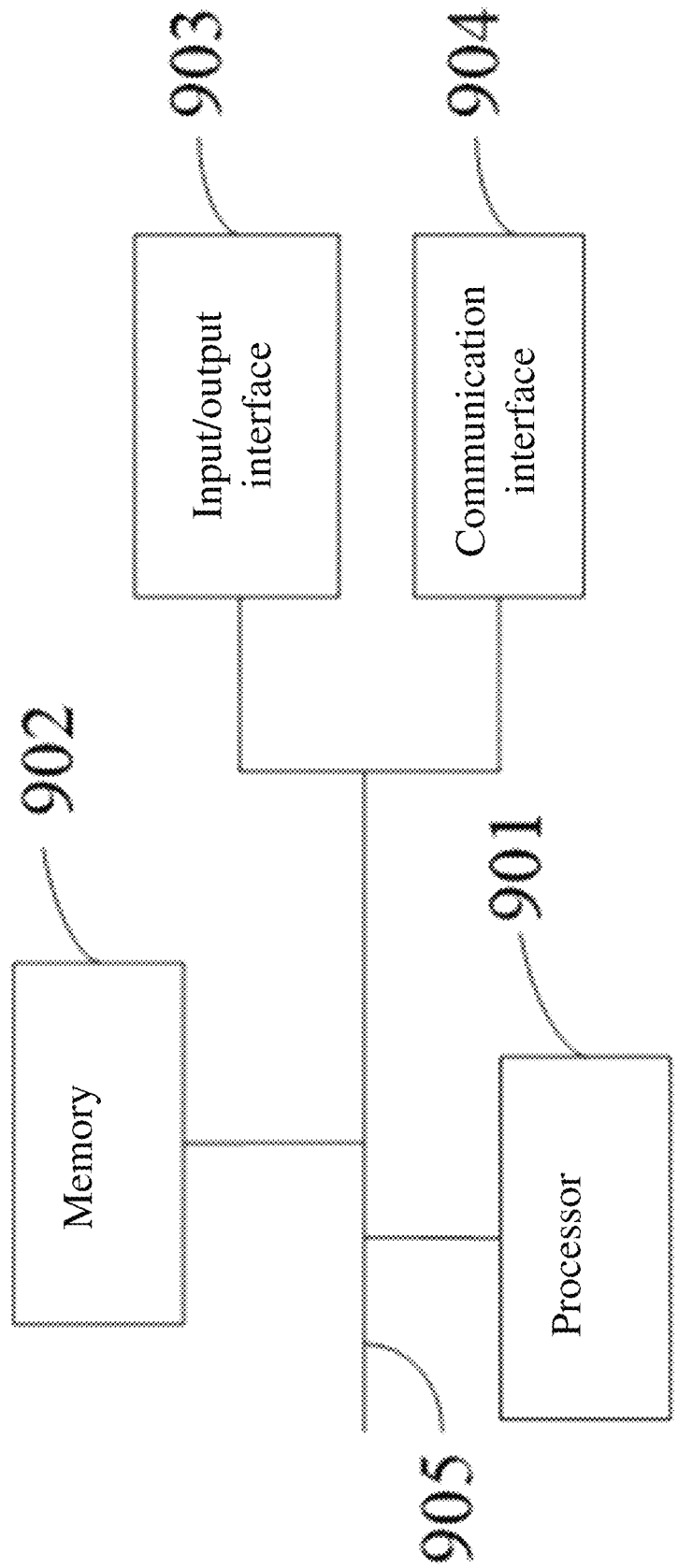
FIG. 9 shows a schematic structural diagram of a computing device according to an embodiment of the present disclosure.

FIG. 9 shows a more specific hardware structure diagram of an electronic device provided in this embodiment, which may include a processor 901, a memory 902, an input/output interface 903, a communication interface 904 and a bus 905. A communication connection with each other is realized among the processor 901, the memory 902, the input/output interface 903 and the communication interface 904 in the device through the bus 905.

The processor 901 can be implemented by a general-purpose CPU (Central Processing Unit), a microprocessor, an application specific integrated circuit (ASIC), or one or more integrated circuits, etc., and is used for executing relevant programs to realize technical schemes provided in the embodiments of this disclosure.

The memory 902 can be implemented in a form of ROM (Read Only Memory), RAM (Random Access Memory), static storage device, dynamic storage device, or the like. The memory 902 can store the operating system and other application programs. When the technical schemes provided in the embodiments of this disclosure is implemented in software or firmware, relevant program codes are stored in the memory 902 and called and executed by the processor 901.

The input/output interface 903 is used to connect the input/output module to realize information input and output. The input/output module can be configured as a component in the device (not shown in the figure), or it can be externally connected to the device to provide corresponding functions. An input device can include a keyboard, a mouse, a touch screen, a microphone and various sensors, and an output device can include a display, a speaker, a vibrator and an indicator.

The communication interface 904 is used to connect with a communication module (not shown in the figure) to realize communication interaction between the device and other devices. The communication module can communicate by wired means (such as USB, network cable, etc.) or by wireless means (such as mobile network, WIFI, Bluetooth, etc.).

The bus 905 includes a path for transmitting information among various components of the device, such as the processor 901, the memory 902, the input/output interface 903 and the communication interface 904.

It should be noted that although the above device only shows the processor 901, the memory 902, the input/output interface 903, the communication interface 904 and the bus 905, in the specific implementation process, the device may also include other components necessary for normal operation. In addition, it can be understood by those skilled in the art that the above-mentioned device may only contain the components necessary for implementing schemes in the embodiments of this disclosure, and need not contain all the components shown in the drawings.

It should be understood by those of ordinary skilled in the art that discussion of any of the above embodiments is only exemplary, and is not intended to imply that the protection scope of the disclosure is limited to these examples; under the concept of this disclosure, the technical features in the above embodiments or different embodiments can also be combined, and the steps can be realized in any order; and there are many other changes in different aspects of one or more embodiments of this disclosure as described above, which are not provided in details for brevity.

One or more embodiment of this disclosure are intended to cover all such alternatives, modifications and variations that fall within that broad scope of the disclosure. Therefore, any omissions, modifications, equivalent substitutions, improvements, etc. made within the spirit and principles of one or more embodiments of this disclosure shall be encompassed within the protection scope of this disclosure.

What is claimed is:

1. A method, executed by a processor, for training a few-shot event detection model based on multilingual prompt learning, applied to an electronic device, the processor, a memory, an input/output interface and a communication interface in the electronic device implementing communication connection with each other in the electronic device through a bus, comprising:

extracting a training data set comprising a plurality of instances from a preset network database by applying a data collector, each of the plurality of instances comprising event text, a real trigger tag and a real event tag;

taking any instance in the training data set as an input instance, and performing event triggering recognition by applying a multilingual prompt model based on the event text of the input instance to obtain a predicted probability distribution of a trigger tag and obtain a first loss;

generating a contrastive instance and a bilingual instance corresponding to the input instance according to the input instance, and performing multilingual prompting and performing cross-lingual encoding according to the input instance and the bilingual instance by applying the multilingual prompt model to obtain joint event characterization;

performing event tag prediction on the joint event characterization by applying a two-level hierarchical prototype network model that is a hierarchical neural network and comprises multiple layers where each successive layer captures increasingly abstract features from input data, and the two-level hierarchical prototype network model comprises a parent prototype network and a child prototype network, and calculating a second loss of the event tag prediction;

performing quaternary contrastive learning by applying a quaternary contrastive learning module according to the input instance, the contrastive instance and the joint event characterization, and obtaining a third loss; and determining a total loss of the few-shot event detection model according to the first loss, the second loss and the third loss, the few-shot event detection model comprising the multilingual prompt model, the two-level hierarchical prototype network model and the quaternary contrastive learning module, and performing model training optimization on the few-shot event detection model based on the total loss;

inputting event text to be detected by applying the input/output interface;

performing language prompt learning on the event text to be detected based on a first prompt template in the multilingual prompt model to obtain a corresponding language prompt, and then performing cross-lingual encoding by applying a cross-lingual encoding model in the multilingual prompt model, which is implemented by using an encoder xlm-roberta, to obtain a trigger tag and event embedding;

calculating a child tag probability distribution for which the event embedding is classified into a respective child tag in the child prototype network by applying the two-level hierarchical prototype network model, and determining a maximum value of child tag probability as a finally recognized event tag, so as to perform few-shot event management according to the detected trigger tag and the event tag, wherein the two-level hierarchical prototype network model is a prototype network, and the memory being configured for storing the event text to be detected, the trigger tag and the event tag; and wherein the encoder xlm-roberta is a scaled cross-lingual sentence encoder, and is pre-trained on 2.5 terabytes (TB) of data across 100 languages using data filtered from Common Crawl, and achieves results on multiple cross-lingual benchmarks.

2. The method according to claim 1, wherein the performing the event triggering recognition by applying the multilingual prompt model based on the event text of the input instance to obtain the predicted probability distribution of the trigger tag and obtain the first loss comprises:

performing language prompt processing on the event text of the input instance by applying the first prompt template in the multilingual prompt model to obtain a modified language prompt;

performing the event triggering recognition by applying the cross-lingual encoding model in the multilingual prompt model according to the language prompt corresponding to the input instance to obtain the predicted probability distribution of the trigger tag; and calculating the first loss according to the predicted probability distribution of the trigger tag.

3. The method according to claim 1, wherein the bilingual instance comprises a Chinese instance and a Spanish instance, and the performing multilingual prompt and cross-lingual encoding according to the input instance and the bilingual instance by applying the multilingual prompt model to obtain the joint event characterization comprises:

obtaining a first language prompt based on a real trigger tag in the input instance by applying an English prompt template in the multilingual prompt model according to the input instance;

obtaining a second language prompt and a third language prompt based on the real trigger tag by respectively applying a Chinese prompt template and a Spanish prompt template in the multilingual prompt model according to the Chinese instance and the Spanish instance;

performing cross-lingual encoding by applying the cross-lingual encoding model in the multilingual prompt model respectively according to the first language prompt, the second language prompt and the third language prompt to generate a corresponding first event embedding, second event embedding and third event embedding; and calculating an average of the first event embedding, the second event embedding and the third event embedding to obtain the joint event characterization of the event embedding, wherein the first language prompt $f_e$ is obtained based on a real trigger tag $\hat{t}$ the input instance by applying an English prompt template in the multilingual prompt model according to the input instance:

$f_e(x,\hat{t}) = [CLS]([\hat{t}]triggers[z_y]event.)[SEP][x][SEP]$, wherein the second language prompt $f_e^{zh}$ and the third language prompt $f_e^{es}$ are obtained based on the real trigger tag by respectively applying the Chinese prompt template and the Spanish prompt template in the multilingual prompt model according to the Chinese instance and the Spanish instance.

4. The method according to claim 1, wherein the performing event tag prediction on the joint event characterization by applying the two-level hierarchical prototype network model and calculating the second loss of the event tag prediction comprises:

respectively calculating a parent tag probability distribution for which the joint event characterization is classified into respective parent tags in the parent prototype network and the child tag probability distribution for which the joint event characterization is classified into respective child tags in the child prototype network;

calculating a loss of the parent prototype network based on the parent tag probability distribution, and calculating a loss of the child prototype network based on the child tag probability distribution; and weighted summing the loss of the parent prototype network and the loss of the child prototype network to obtain the second loss of the two-level hierarchical prototype network model.

5. The method according to claim 4, wherein the respectively calculating the parent tag probability distribution for which the joint event characterization is classified into the respective parent tags in the parent prototype network and the child tag probability distribution for which the joint event characterization is classified into the respective child tags in the child prototype network comprises:

calculating a first distance between the joint event characterization and one of the respective parent tags in the parent prototype network, and obtaining a parent tag probability of the joint event characterization on all of parent tags according to the first distance so as to obtain the parent tag probability distribution of the joint event characterization, wherein the predicted parent tag is a parent tag corresponding to a maximum parent tag probability; and calculating a second distance between the joint event characterization and one of the respective child tags in the child prototype network, and obtaining a child tag probability of the joint event characterization on all of child tags according to the first distance so as to obtain the child tag probability distribution of the joint event characterization, wherein a predicted final tag is a child tag corresponding to a maximum child tag probability.

6. An apparatus for training a few-shot event detection model based on multilingual prompt learning, applied to an electronic device, a processor, a memory, an input/output interface and a communication interface in the electronic device implementing communication connection with each other in the electronic device through a bus, wherein the apparatus for training the few-shot event detection model comprises:

a data collector configured for extracting a training data set comprising a plurality of instances from a preset network database, each of the plurality of instances comprising event text, a real trigger tag and a real event tag;

a triggering recognition module configured for taking any instance in the training data set as an input instance, and performing event triggering recognition by applying a multilingual prompt model based on the event text of the input instance to obtain a predicted probability distribution of a trigger tag and obtain a first loss;

a joint characterization module configured for generating a contrastive instance and a bilingual instance corresponding to the input instance according to the input instance, and performing multilingual prompt and cross-lingual encoding according to the input instance and the bilingual instance by applying the multilingual prompt model to obtain joint event characterization;

a tag prediction module configured for performing event tag prediction on the joint event characterization by applying a two-level hierarchical prototype network model that is a hierarchical neural network and comprises multiple layers where each successive layer captures increasingly abstract features from input data, and the two-level hierarchical prototype network model comprises a parent prototype network and a child prototype network, and calculating a second loss of the event tag prediction;

a quaternary contrastive learning module configured for performing quaternary contrastive learning according to the input instance, the contrastive instance and the joint event characterization, and obtaining a third loss; and a model training and detection module configured for determining a total loss of a few-shot event detection model according to the first loss, the second loss and the third loss, the few-shot event detection model comprising the multilingual prompt model, the two-level hierarchical prototype network model and the quaternary contrastive learning module, and performing model training optimization on the few-shot event detection model based on the total loss to obtain the few-shot event detection model;

inputting event text to be detected by applying the input/output interface, the processor being configured for performing language prompt learning on the event text to be detected based on a first prompt template in the multilingual prompt model to obtain a corresponding language prompt, and then performing cross-lingual encoding by applying a cross-lingual encoding model in the multilingual prompt model, which is implemented by using an encoder xlm-roberta, to obtain a trigger tag and event embedding;

calculating a child tag probability distribution for which the event embedding is classified into a respective child tag in the child prototype network by applying the two-level hierarchical prototype network model, and selecting a maximum value of child tag probability as a finally recognized event tag, so as to perform few-shot event management according to the detected trigger tag and the event tag, the two-level hierarchical prototype network model being a prototype network, and the memory being configured for storing the event text to be detected, the trigger tag and the event tag, wherein the encoder xlm-roberta is a scaled cross-lingual sentence encoder, and is pre-trained on 2.5 terabytes (TB) of data across 100 languages using data filtered from Common Crawl, and achieves results on multiple cross-lingual benchmarks.

7. A computing device, comprising a processor, a memory, a communication interface and a communication bus, wherein the processor, the memory and the communication interface are configured to be communicated with each other through the communication bus; and the memory is configured for storing at least one executable instruction, which enables the processor to execute steps of a method for training a few-shot event detection model based on multilingual prompt learning according to claim 1.

8. A non-transitory computer storage medium, wherein the non-transitory computer storage medium is stored with at least one executable instruction, the at least one executable instruction enabling a processor to execute steps of a method for training a few-shot event detection model based on multilingual prompt learning according to claim 1.

* * * * *